United States Patent
McLeod et al.

(10) Patent No.: US 11,808,895 B2
(45) Date of Patent: Nov. 7, 2023

(54) METHODS AND DEVICES FOR CROSSTALK COMPENSATION

(71) Applicant: STMICROELECTRONICS (RESEARCH & DEVELOPMENT) LIMITED, Marlow (GB)

(72) Inventors: Stuart McLeod, Edinburgh (GB); Ed Hawkins, Edinburgh (GB)

(73) Assignee: STMICROELECTRONICS (RESEARCH & DEVELOPMENT) LIMITED, Marlow (GB)

(*) Notice: Subject to any disclaimer, the term of this patent is extended or adjusted under 35 U.S.C. 154(b) by 507 days.

(21) Appl. No.: 17/119,385

(22) Filed: Dec. 11, 2020

(65) Prior Publication Data

US 2022/0187431 A1      Jun. 16, 2022

(51) Int. Cl.
| | | |
|---|---|---|
| G01S 7/48 | (2006.01) | |
| G01S 7/497 | (2006.01) | |
| G01S 17/10 | (2020.01) | |
| G01S 7/4865 | (2020.01) | |

(52) U.S. Cl.
CPC ............ G01S 7/497 (2013.01); G01S 7/4865 (2013.01); G01S 17/10 (2013.01)

(58) Field of Classification Search
USPC ........................................................ 356/5.01
See application file for complete search history.

(56) References Cited

U.S. PATENT DOCUMENTS

| | | | |
|---|---|---|---|
| 8,274,037 B2 | 9/2012 | Ritter et al. | |
| 11,120,104 B2 * | 9/2021 | Moore | G01S 7/497 |
| 2008/0075457 A1 * | 3/2008 | Skoog | H04B 10/0795 398/9 |
| 2018/0253404 A1 | 9/2018 | Moore et al. | |
| 2020/0081122 A1 * | 3/2020 | Uedaira | H01S 5/02257 |
| 2020/0191958 A1 * | 6/2020 | Ikuta | G01S 7/4865 |
| 2021/0382964 A1 * | 12/2021 | Moore | G01S 7/4865 |

FOREIGN PATENT DOCUMENTS

EP       3370079 A1 *   9/2018   ............ G01S 17/10

OTHER PUBLICATIONS

Stmicroelectronics, "VL53L0X Ranging Module Cover Window Guidelines," AN4907 Application Note, ST Life. Augmented, Nov. 2018, 21 pages.

Stmicroelectronics, "World Smallest Time-of-Flight Ranging and Gesture Detection Sensor Application Programming Interface," UM2039 User Manual, ST Life.Augmented, Jun. 2016, 26 pages.

\* cited by examiner

*Primary Examiner* — James R Hulka

(74) *Attorney, Agent, or Firm* — Slater Matsil, LLP

(57) ABSTRACT

A method includes measuring a first set of photon-event data collected from a first crosstalk-monitoring zone of an optical receiver during a first period of time of flight ranging, measuring a second set of photon-event data collected from a second crosstalk-monitoring zone of the optical receiver during the first period of time of flight ranging, and generating a first dynamic crosstalk compensation value for a first histogram region of the optical receiver using the first set of photon-event data, the second set of photon-event data, and a native crosstalk compensation value for the first histogram region of the optical receiver.

23 Claims, 14 Drawing Sheets

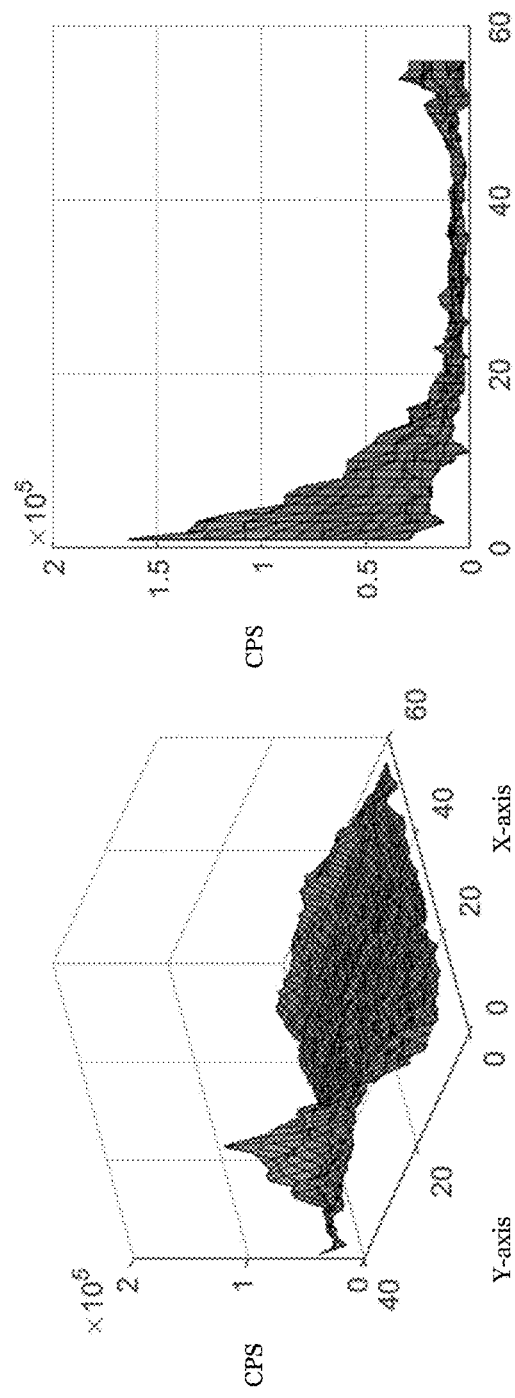
FIG. 5B
FIG. 5A
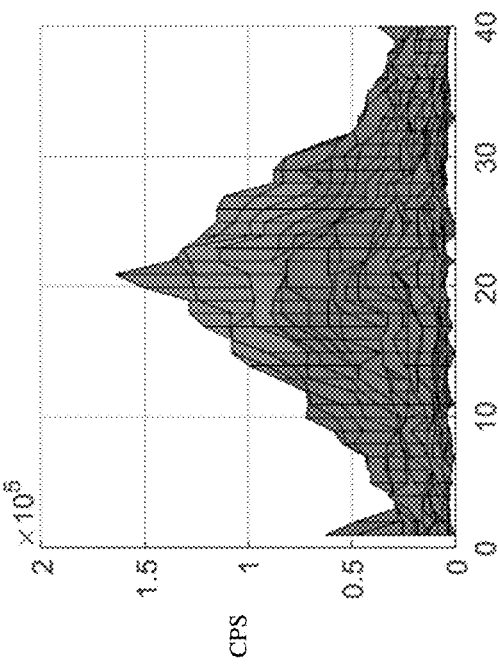
FIG. 5D
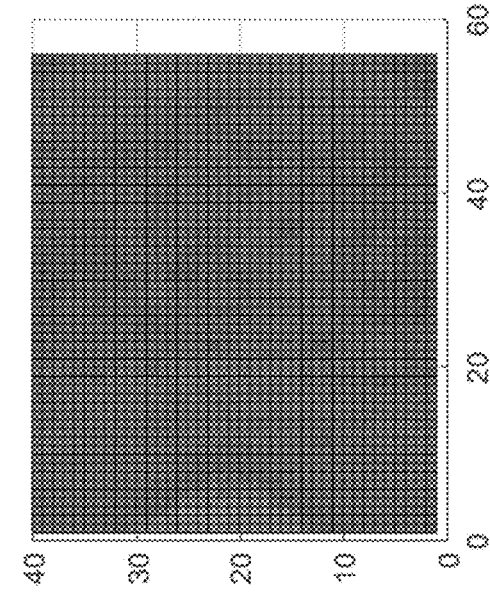
FIG. 5C

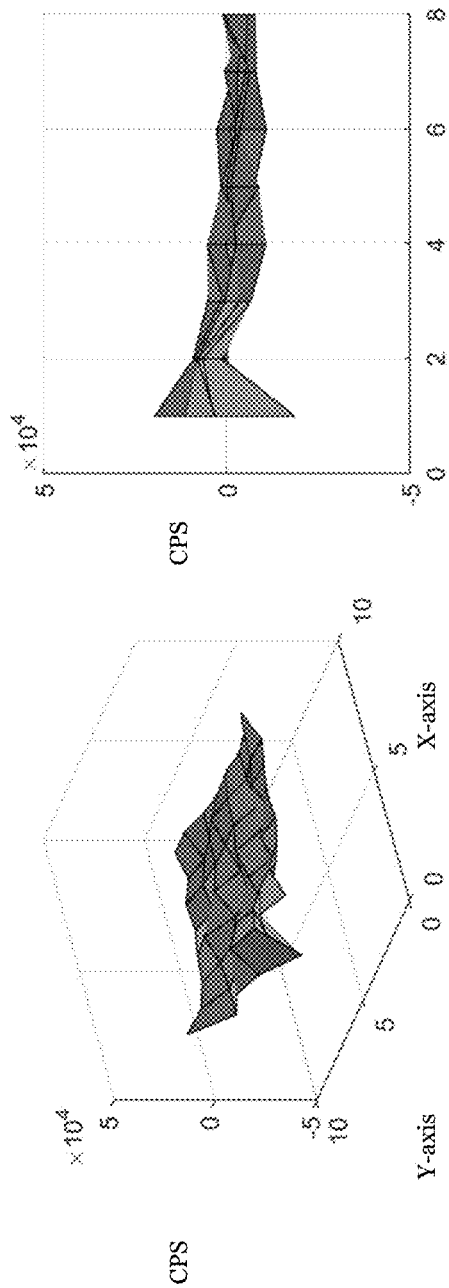
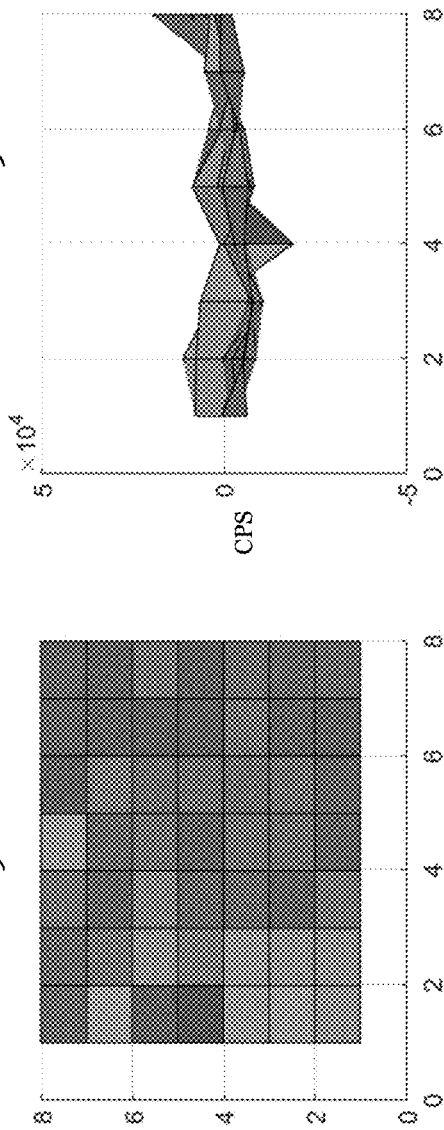
FIG. 9A  FIG. 9B  FIG. 9C  FIG. 9D

METHODS AND DEVICES FOR CROSSTALK COMPENSATION

TECHNICAL FIELD

This application relates to methods and devices for crosstalk compensation.

BACKGROUND

Time of Flight (ToF) systems may operate by using optical pulses to project light into an environment and by using optical receivers to sense the light's return after reflection from objects in the environment. The optical receivers may undesirably detect crosstalk, which may interfere with the accuracy of ToF systems. Crosstalk interference may be diminished by calibrating a ToF system. However, calibration may be sensitive to variations in operating conditions like smudges or other imperfections that may alter the path of light from an optical pulse. Dynamic compensation that adjusts during operation may be desirable to improve operation of ToF systems.

SUMMARY

In accordance with an embodiment, a method includes: measuring a first set of photon-event data collected from a first crosstalk-monitoring zone of an optical receiver during a first period of time of flight ranging; measuring a second set of photon-event data collected from a second crosstalk-monitoring zone of the optical receiver during the first period of time of flight ranging; and generating a first dynamic crosstalk compensation value for a first histogram region of the optical receiver using the first set of photon-event data, the second set of photon-event data, and a native crosstalk compensation value for the first histogram region of the optical receiver.

In accordance with an embodiment, A Time of Flight system includes: an optical source configured to emit an light into an environment; an optical receiver including: a first histogram region comprising a plurality of radiation-sensitive pixels; a first crosstalk-monitoring zone comprising a plurality of radiation-sensitive pixels; and a second crosstalk-monitoring zone comprising a plurality of radiation-sensitive pixels. The Time of Flight system further includes a processor in communication with the optical source, the optical receiver and a memory wherein the memory stores an instruction set that, when executed, causes the processor to: drive the optical source to emit light for a time of flight ranging; collect data for a photon-count histogram from the first histogram region; calculate a dynamic crosstalk compensation value for the first histogram region from a first set of photon-event data received from the first crosstalk-monitoring zone during the time of flight ranging and a second set of photon-event data received from the second crosstalk-monitoring zone during the time of flight ranging; and adjust the photon-count histogram based on the dynamic crosstalk compensation value.

In accordance with an embodiment, a method includes measuring photon-event data from a first leakage-monitoring zone of an optical receiver; determining that a leakage value of the first leakage-monitoring zone is below a first threshold value; measuring a first set of photon-event data collected from a first crosstalk-monitoring zone of the optical receiver during a first period of time of flight ranging; measuring a second set of photon-event data collected from a second crosstalk-monitoring zone of the optical receiver during the first period of time of flight ranging; generating a first dynamic crosstalk compensation value for a first histogram region of the optical receiver using the first set of photon-event data, the second set of photon-event data, and a native cross-talk compensation value for the first histogram region of the optical receiver; measuring a temperature; and producing a final dynamic crosstalk compensation value for the first histogram region by adjusting the first dynamic crosstalk compensation value based on the temperature.

BRIEF DESCRIPTION OF THE DRAWINGS

One or more embodiments will now be described, by way of example only, with reference to the annexed figures, wherein:

FIG. 5A through FIG. 5D illustrate various view of a signal map depicting crosstalk detected by an optical receiver in native conditions;

FIG. 9A through FIG. 9D depict a signal map showing results of dynamic crosstalk compensation of an embodiment;

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the extent of protection or the scope of the embodiments.

Time of Flight (ToF) systems are used in many applications to detect objects in a three dimensional space. In various embodiments, a Time of Flight system may cast light onto a scene and detect the time it takes for light to be reflected from objects in the scene back to the Time of Flight system. In various embodiments, the time of flight of the photons reflected from objects in the environment, along with the speed of light, may be used to calculate the distances between objects in a three dimensional environment and the ToF system.

Figure 1:
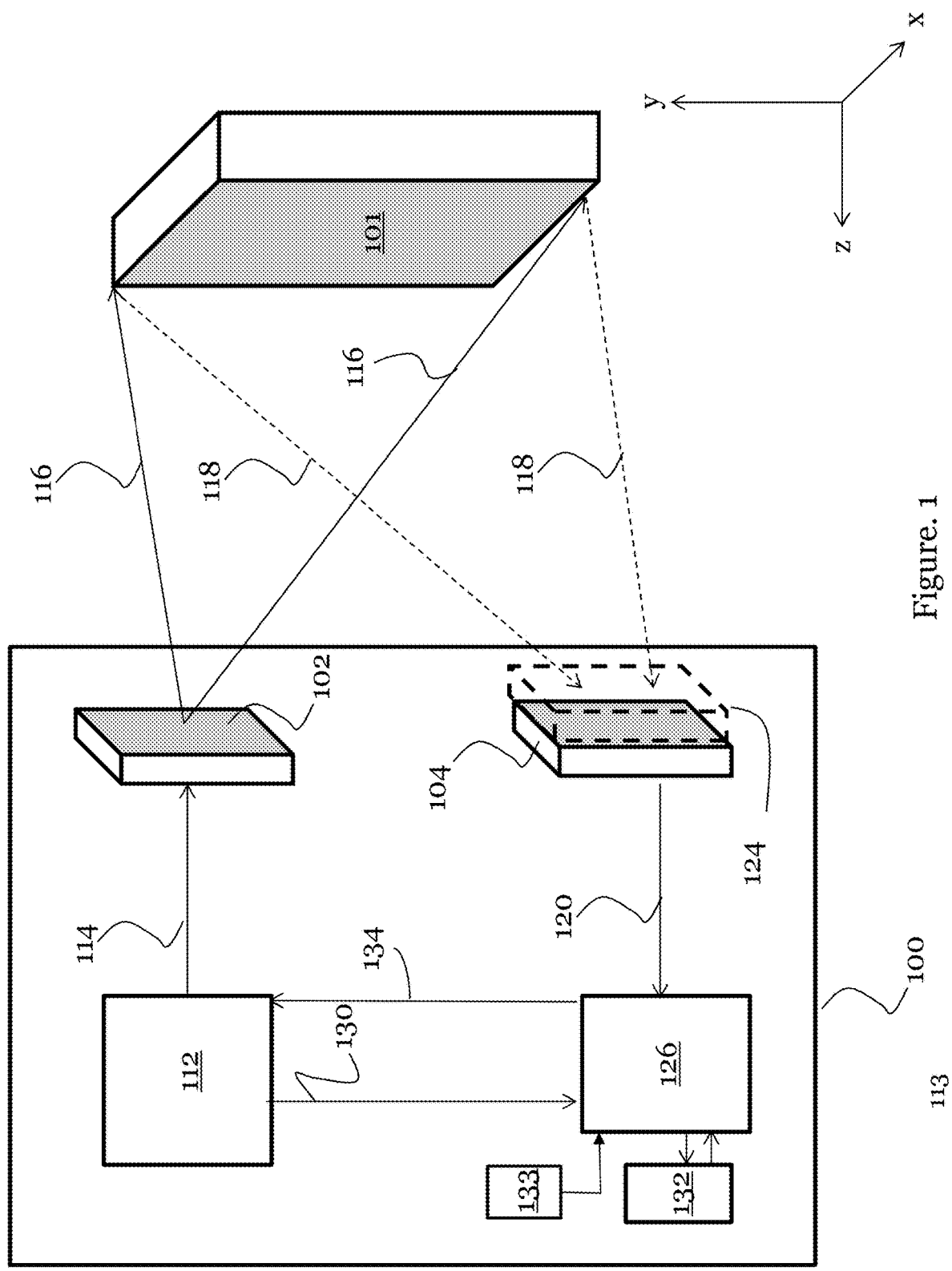
FIG. 1 illustrates a ToF system of an embodiment.

FIG. 1 illustrates a ToF system 100 of an embodiment of the present disclosure.

An object 101 is disposed in a three dimensional environment positioned in front of the ToF system 100. The ToF system 100 may be used to determine the proximity of the object 101 to the ToF system 100. The object 101 is provided for explanatory purposes. The three-dimensional environment may include additional objects of various shapes or sizes disposed at varying distances from the ToF system 100 and the ToF system 100 may determine the proximity of the various objects in the three-dimensional environment during ToF rangings. The object 101 may comprise multiple surfaces at various distances from the ToF system 100, and the ToF system 100 may determine the depth of the different surfaces of the object 101. The ToF system 100 may simultaneously detect the proximity of additional objects in the three dimensional environment from the ToF system 100. In various embodiments, the ToF system 100 may also comprise a memory 132. The processor 126 may store data in the memory 132 and retrieve data from the memory 132. The memory 132 may be a non-transitory computer readable medium. The memory 132 may also store programs that may be executed by the processor 126.

The ToF system 100 may comprise an optical source 102 and an optical receiver 104.

Figure 2B:
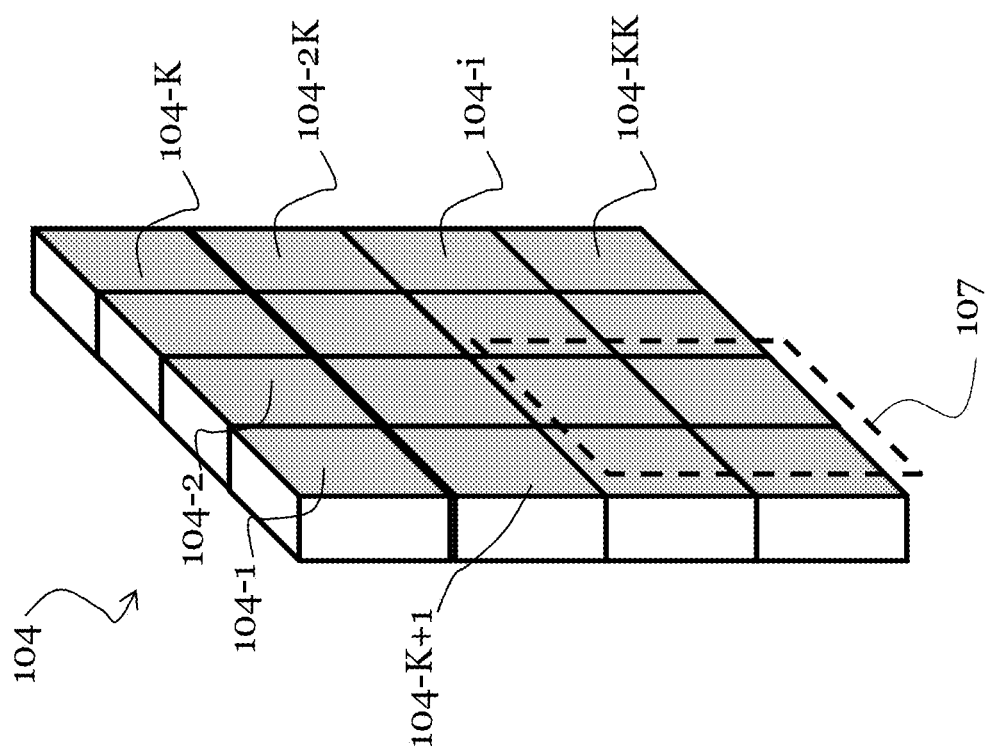
FIG. 2B shows an enlarged view of an optical receiver, of an embodiment.
Figure 2A:
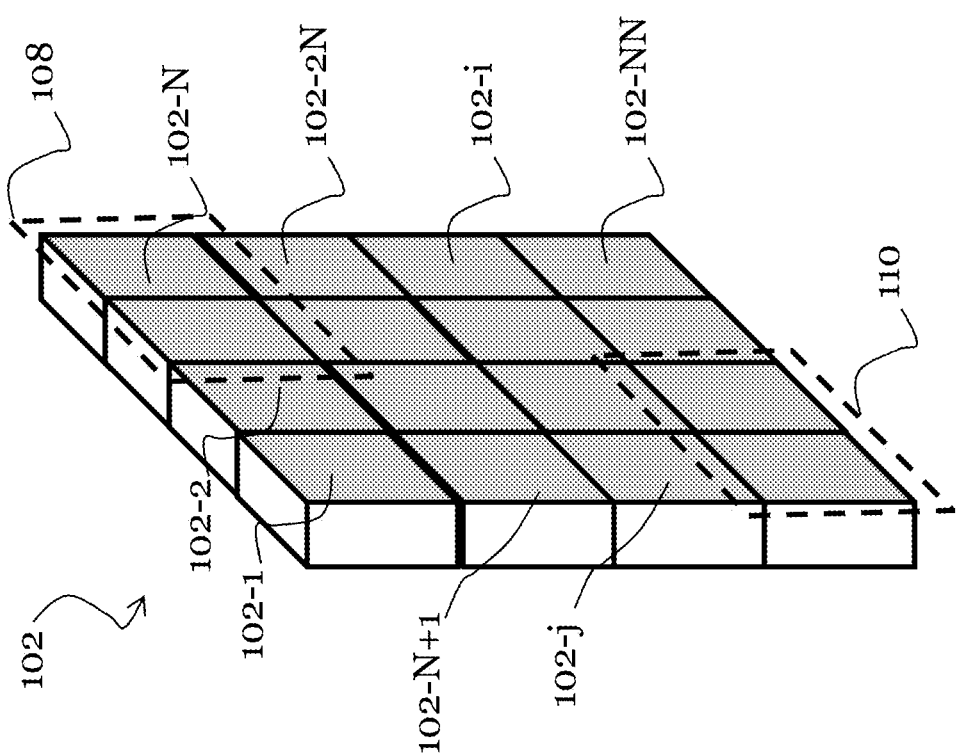
FIG. 2A shows an enlarged view of an optical source, of an embodiment.

FIG. 2A shows an enlarged view of an optical source 102, in accordance with an embodiment.

As depicted in FIG. 2A, the optical source 102 may comprise a plurality of optical emitters 102-1 to 102-NN arranged as an array. Although the example of FIG. 2A illustrates the optical emitters 102-1 to 102-NN as being arranged in a square N×N array, other array shapes (e.g. ellipsoidal arrays or circular-shaped arrays) may be possible in other embodiments. Each of the optical emitters 102-1 to 102-NN may comprise one or more infrared sources, modulated light emitting diodes (LEDs), or semiconductor lasers, or combinations thereof, although other types of optical sources may be possible.

In various embodiments, where the optical emitters 102-1 to 102-NN comprise semiconductor lasers, an optical emitter 102-$i$ of the array of optical emitters 102-1 to 102-NN may comprise one or more vertical-cavity surface-emitting lasers (VCSELs), quantum well lasers, quantum cascade lasers, interband cascade lasers, or vertical external-cavity surface-emitting lasers (VECSELs), or the like.

The optical emitters 102-1 to 102-NN may be configured to operate at the same wavelength. In other embodiments, however, the optical emitters 102-1 to 102-NN may operate at different wavelengths. For example, the group 108 of optical sources and the group 110 of optical emitters 102-1 to 102-NN may operate at different wavelengths. The optical emitters 102-1 to 102-NN may exhibit continuous wave (CW) operation, quasi-continuous wave (QCW) operation, or pulsed operation.

Referring back to FIG. 1, in various embodiments, the ToF system 100 may comprise an optical source driver 112. The operation of the optical emitters 102-1 to 102-NN of the optical source 102 may be controlled by the optical source driver 112, which is configured to generate a drive current 114 that is capable of activating the array of optical emitters 102-1 to 102-NN, thereby causing the optical emitters 102-1 to 102-NN to emit photons.

In various embodiments, the array of optical emitters 102-1 to 102-NN may be an addressable array of optical emitters 102-1 to 102-NN. The array of optical emitters 102-1 to 102-NN may be individually addressable where an optical emitter 102-$i$ (shown in FIG. 2A) of the array of optical emitters 102-1 to 102-NN is addressable independently of another optical emitter 102-$j$ of the array of optical emitters 102-1 to 102-NN. The drive current 114 provided by the optical source driver 112 to the optical source 102 may cause an optical emitter 102-$i$ to be activated (and thereby emit photons), while simultaneously keeping an optical emitter 102-$j$ deactivated (and thereby not emit a photons). In various embodiments, the optical emitters 102-1 to 102-NN may be addressable as a group or cluster, where one group 108 of optical emitters 102-1 to 102-NN is addressable independently of another group 110 of optical emitters 102-1 to 102-NN.

In various embodiments, the drive current 114 provided by the optical source driver 112 to the optical source 102 may cause the group 108 of optical emitters 102-1 to 102-NN to be activated (and thereby emit a photon), while simultaneously causing another group 110 of optical emitters 102-1 to 102-NN to be deactivated (and thereby not emit a photon).

Radiation (light) emanating from the optical source 102, collectively shown in FIG. 1 as reference numeral 116 using solid arrows, may be incident upon the object 101. The incident radiation 116 is reflected off the object 101 to produce reflected radiation 118. It is noted that although incident radiation 116 and reflected radiation 118 are represented in FIG. 1 by a few arrows, all radiation incident on and reflected from the object 101 may be combined in one beam or cone of radiation. While some part of the incident radiation 116 may be scattered depending upon the surface features of the object 101, a significant part of the incident radiation 116 may be reflected, thereby producing the reflected radiation 118.

The optical receiver 104 receives the reflected radiation 118 and generates an output signal 120 in response to the reflecting radiation 118 striking the optical receiver 104.

In various embodiments, the optical receiver 104 may comprise a lens 124 to direct photons from the environment into the sections of the optical receiver 104.

In various embodiments, the ToF system 100 may comprise one or more time to digital converters. A TDCs may measure the interval between the emission of incident radiation 116 from the optical source 102 and the arrival of reflected radiation 118 at the optical receiver 104 and provide it to the processor 126.

FIG. 2B shows an enlarged view of the optical receiver 104, in accordance with an embodiment.

As depicted in FIG. 2B, the optical receiver 104 may comprise a plurality of radiation-sensitive pixels 104-1 to 104-KK. Although the example of FIG. 2B illustrates the radiation-sensitive pixels 104-1 to 104-KK as being arranged in a square K×K array, other array shapes (e.g. ellipsoidal arrays or circular-shaped arrays) may be possible in other embodiments.

The radiation-sensitive pixels 104-1 to 104-KK may comprise single-photon avalanche diodes (SPADs), photo diodes (PDs), avalanche photo diodes (APDs), or combinations thereof. In various embodiments, some or all of the plurality of radiation-sensitive pixels 104-1 to 104-KK may comprise a plurality of individual light-detecting sensors. The radiation-sensitive pixels 104-1 to 104-KK may generate an event signal each time they are hit by a photon.

As shown in FIG. 1, the ToF system 100 further comprises a processor 126 configured to receive the output signal 120 from the optical receiver 104 to communicate the signals generated from the radiation-sensitive pixels 104-1 to 104-KK detect photons. The processor 126 may analyze the data. In various embodiments, analysis may determine the proximity of the object 101, or objects, detected by the optical receiver 104 to the ToF system 100 based on the output signal 120.

The optical source driver 112 may be programmed to drive all the optical emitters 102-1 to 102-NN in the array of optical emitters 102-1 to 102-NN to generate incident radiation pulses. The optical emitters may be driven independently, in groups, or a whole. The optical source driver 112 may receive a control signal 134 from the processor 126 that initiates the optical source driver 112. In various embodiments, the optical source driver 112 may provide data for synchronization at an output 130 to the processor 126.

The radiation from the optical source 102 may be projected in the environment and reflected from object 101. In various embodiments the emission may occur in a predetermined timing sequence or at predetermined timing intervals. The object 101 may reflect the incident radiation 116 and the arrival times of the pulses of reflected radiation 118 at the optical receiver 104 are proportional to twice the distance between the object 101 and the ToF system 100, based on the speed of light in the measurement medium or environment. The arrival time of a photon may be used to calculate the distance of an object that reflected the photon.

The optical source 102 may comprise an array of semiconductor lasers (e.g. VCSELs), while the optical receiver 104 may comprise an array of high speed photodetectors (e.g. SPADs). The optical receiver 104 may be configured to record at least one of arrival times, pulse shapes, or intensities of the pulses of reflected radiation 118. Reflected radiation 118 may arrive at different times at the optical receiver 104, depending on the respective distances between the different parts of the object 101 or other objects in the three-dimensional environment and the ToF system 100. The reflected radiation 118 may be detected synchronously with a timing signal that is configured to cause the optical source driver 112 to generate incident radiation 116. The processor 126 may analyze the ToF between emission of incident radiation 116 travelling towards the object 101 and arrival of reflected radiation 118 received at the optical receiver 104 to determine the proximity of the object 101 or objects in the three-dimensional environment. A plurality of proximity measurements may be used to generate a comprehensive set of data to accurately determine the depth (e.g. along the z-axis shown in FIG. 1) of the object or objects in the three-dimensional environment.

In various embodiments, photons detected by a radiation-sensitive pixel, or a group of radiation-sensitive pixels, during a ToF ranging may be categorized based on the time of flight to generate a histogram of estimated distances of the object or surface that reflected the radiation to the radiation-sensitive pixel. The time of flight of a photon sensed at a radiation-sensitive pixel may grouped into a bin based on the time of arrival of the photon at the optical receiver 104. The time of arrival, will correlate to distance of the object from the ToF system 100. As additional photons are sensed during a measurement (exposure, frame or ToF ranging), they may also be assigned to a bin. The various bins may accumulate a photon count and the distribution of photons in the various bins may be used to calculate the distance from the ToF system 100 of the reflective surface measured at the radiation-sensitive pixel. In various embodiments, a photon-count histogram may be accumulated over a plurality of samples.

Figure 3:
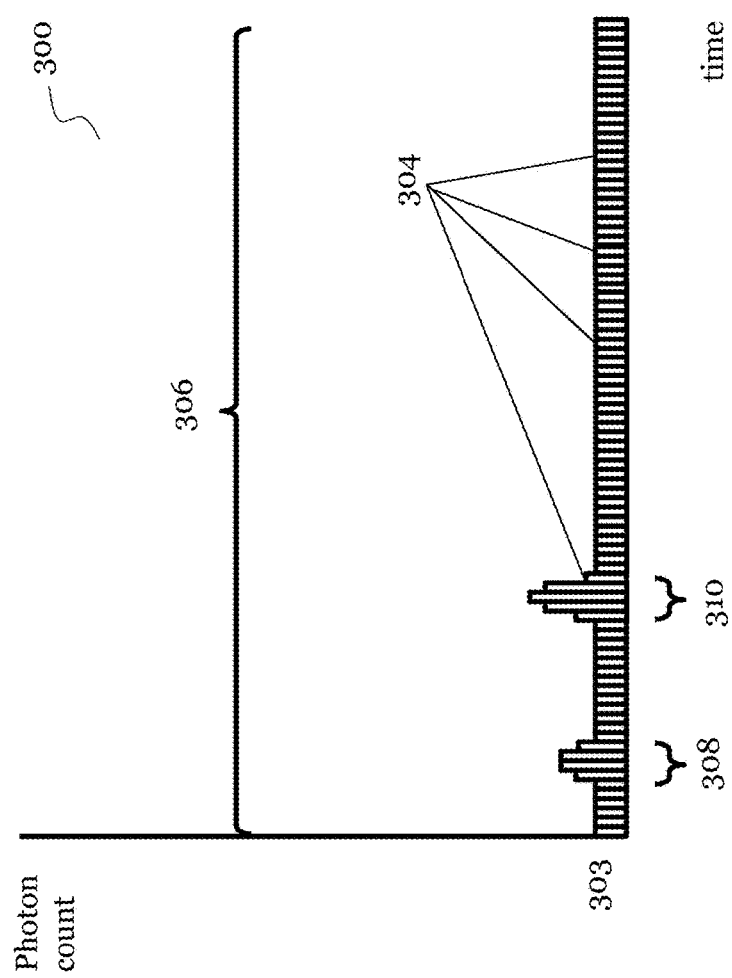
FIG. 3 depicts a photon-count histogram.

FIG. 3 depicts a photon-count histogram 300.

The vertical axis of the photon-count histogram 300 represents the magnitude of photons counted. The horizontal axis of the histogram represents the time of flight of the photons. During a counting period 306 after an emissions of an optical pulse, reflected photons may be detected the optical receiver 104 and grouped depending on the time between the emission of the optical pulse sourcing the photon and the time that they are detected. These groupings may be referred to as bins 304. For example, a 64-nanosecond counting period 306 may be divided into 64 periods, or bins, each period comprising a one nanosecond period. The duration and number of bins may differ in various embodiment.

In various embodiments, the histogram for a ToF ranging may be accumulated from a plurality of samples. For example, during a first sample, a first optical pulse may be emitted and photons counted according to their times of flight. During a second sample, a second optical pulse may be emitted and the photons counted according to their times of flight. The counts from the first and second samples may be aggregated into a single histogram for a ToF ranging. As will be appreciated, in various embodiments, a single histogram may aggregate any number of samples desired.

Each bin may also correspond to a distance range because the time ranges may be correlated to distances based on the relationship between the time of flight of the photons and the speed of light. The bins of the histogram may be alternatively represented, or referred to as distances rather than time because of this relationship.

In various embodiments, a photon-count histogram 300 may be used to detect objects in the environment. The objects may be reflected in the histogram by peaks in the photon count of the photon-count histogram 300. For example, a peak 310 may correspond to a first object located at a first distance from the ToF system 100 in the environment. The processor 126 may analyze the photon-count histogram 300 to identify peaks and determine the distance of the object producing the peak in the photon count.

Returning to FIG. 2B, in various embodiments, the radiation-sensitive pixels 104-1 to 104-KK may be divided into histogram regions. Each histogram region of the optical receiver may produce a single histogram. For example, an optical receiver comprising 64 histogram regions, may generate 64 histograms In various embodiments, the histogram regions may be sampled in groups. For example, in various embodiments, 16 histogram regions of a 64 histogram-region optical receiver may first be sampled to generate photon-count histograms for those 16 histogram regions. 16 more histogram regions may then be sampled to generate photon-count histograms for the second 16 histogram regions. And, this may continue until all 64 histogram regions have been sampled.

The photon counts of the individual radiation-sensitive pixels of a region may be aggregated to produce the histogram for that region. It may be advantageous to build a photon-count histogram 300 from more than one radiation sensitive pixel to improve the signal to noise ratio of a photon-count histogram 300. As an example, a first region 107 of the optical receiver 104 may comprise four radiation-sensitive pixels. And, the photon counts produced by each of the four radiation-sensitive pixels of the first region 107 may be aggregated to accumulate the photon-count histogram for the first histogram region. In various embodiments, the outputs of each radiation-sensitive pixel of a given region may be coupled to an OR tree for that region to produce a photon count for that region. As will be appreciated, the number or regions per optical receiver 104 may differ in various embodiments. The number of radiation-sensitive pixels per histogram region may also differ in various embodiments.

With reference to FIG. 3, crosstalk detected by an optical receiver in a ToF system may cause unwanted peaks in the photon-count histogram 300. Crosstalk may be caused with photons from an optical pulse are detected and counted without being projected in the environment. This may cause a crosstalk peak 308 in the photon-count histogram 300. And, the crosstalk may compromise the performance of a ToF system. Ambient light in an environment may contribute noise to a histogram. This may be represented in a histogram as a constant level 303.

In various embodiments, a ToF system 100 may be embedded in a larger device such a mobile phone. The ToF system 100 may be protected by glass or another material. However, this may increase the crosstalk experienced by the ToF system 100.

Figure 4:
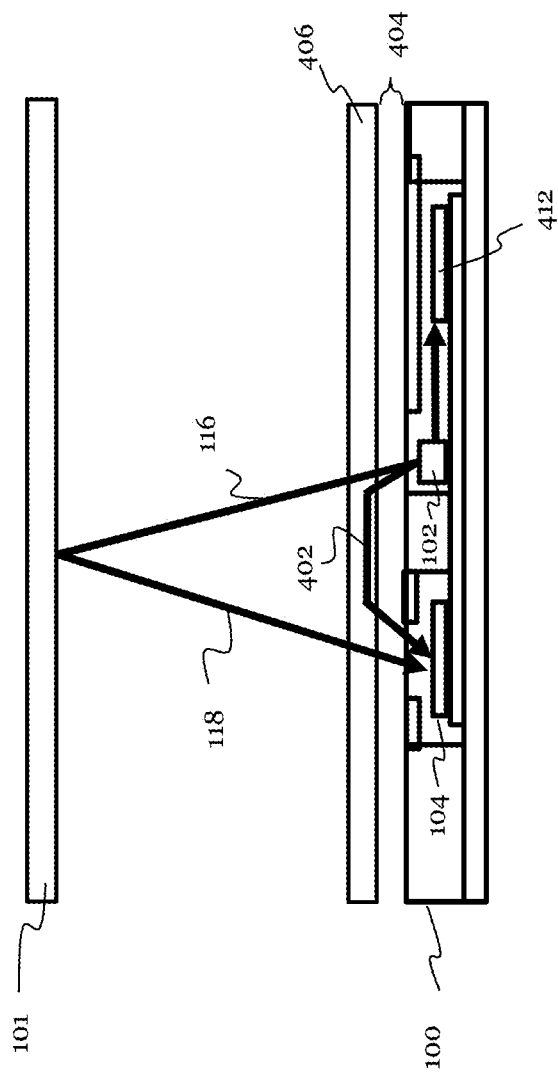
FIG. 4 depicts a ToF system with a protective covering of an embodiment.

FIG. 4 depicts an embodiment of the ToF system 100 with a protective covering of an embodiment.

A optical source 102 may project outgoing radiation 116 into an environment where it is reflected from an object 101 and returned to an optical receiver 104. In various embodiments, a protective covering 406, which may be made out of glass, plastic or other material, may fitted between the optical source 102 and the environment. The protective covering 406 may undesirably redirect outgoing light from the optical source 102 to the optical receiver 104 along a crosstalk path 402. This light may be detected by the optical receiver 104 and counted as part of one or more photon-count histograms 300. In various embodiments, after an optical pulse crosstalk may be detected nearly instantaneously because of the small distance that light has to travel from the optical source 102 to the optical receiver 104. This may cause an the ToF system to erroneously determine that an object is located at a zero distance or near-zero distance from the ToF system, which may be undesirable. In various embodiments, the ToF system 100 may further comprise a reference optical receiver 412 that may be used to track the time of an initial pulse from the optical source 102 for calculating the times of flight of photons emitted by the optical source 102.

Crosstalk correction techniques may compensate for crosstalk by subtracting crosstalk contributions from a photon-count histogram 300. Some such techniques are disclosed in U.S. patent application Ser. No. 15/886,353, which is incorporated by reference herein. Crosstalk correction may be accomplished by storing a normalized histogram calculated from data collected during a calibration that contains only crosstalk. Data may be collected and calculated for each histogram region of an optical receiver. Collectively, this data set may be referred to as the "crosstalk shape." During calibration, the crosstalk shape can be used to find a native crosstalk compensation value for each histogram region, for example by finding the peak of the crosstalk pulse. During real time operations, a crosstalk histogram may be calculated, for each region, by scaling the normalised crosstalk shape according to the native crosstalk compensation value for each histogram region and by aligning it in time with the expected location of the crosstalk, which may be the zero-range position. The calculated crosstalk histogram, for each region, may be subtracted from its relevant region histogram to compensate the crosstalk for that particular region.

The magnitude of the crosstalk detected by the optical receiver 104 may be dependent on a number of factors such as the distance 404 between ToF system 100 and a protective covering, the type of protective covering 406, the thickness of the protective covering 406, imperfections in the protective covering 406, materials used for protective covering, finish of the protective covering 406, and other variations in an arrangement of the optical source 102 and the optical receiver 104 (such as, but not limited to, field of view, separation of components like the optical source and optical receiver, existence of baffles, gaskets). Crosstalk may create under-ranging or over-ranging inaccuracies if a crosstalk pulse in a photon-count histogram 300 overlaps with a pulse created from photons reflected from an object in an environment.

Calibration may be performed to adjust a ToF system 100 to allow crosstalk cancellation. In various embodiments, native crosstalk-compensation values—crosstalk compensation values when the ToF is in a controlled environment—may be generated and stored in a memory 132 during calibration. The processor 126 may reference the native crosstalk compensation values during ranging operations to determine the magnitude of any crosstalk compensation.

In various embodiments, calibration may be performed before a ToF system 100 is introduced into the field. Calibration may comprise testing the operation of a ToF system 100 before the protective cover 402 has been installed and after a protective cover 402 has been installed to determine the impact that the protective cover 402 may have on crosstalk realized by a ToF system.

Crosstalk compensation values may be calculated from test results generated from operation of the ToF system 100 without a protective cover 402 and with an object at a known distance in the range of the ToF system, and from test results generated from operation of the ToF system 100 with a protective cover 402 and without any objects located in range of the ToF system. This may provide test data to measure the magnitude of crosstalk introduced by the addition of the protective cover 402 to the ToF system. Crosstalk compensation values may be produced from this data to scale the magnitude of the compensation for a photon-count histogram.

In various embodiments, a native crosstalk-compensation value may be generated for each histogram region of an optical receiver 104. Each of these values may be stored in memory 132 and accessed to adjust each photon-count histogram according to the corresponding crosstalk-compensation value. For example, if an optical device comprises 64 histogram regions, a native crosstalk-calibration value may be calculated during calibration for each of the 64 histogram regions.

Crosstalk calibration values generated before a ToF system 100 has been introduced into the field may not account for variations that occur after the ToF system 100 has been introduced into the field that may impact crosstalk. Dirt, fingerprints, smudges or other imperfections on a protective cover 402 may increase the amount the of crosstalk detected by an optical receiver 104.

FIG. 5A through FIG. 5D illustrate various view of a signal map depicting crosstalk detected by an optical receiver in native conditions.

The signal map in FIG. 5A depicts a top down view of a grid that corresponds to an optical receiver 104. The cells of the grid in the signal map correspond to the radiation-sensitive pixels of an optical receiver 104. The cells of the grid in the signal map are shaded to represent the total number of photons counted during a sample performed in a system in native condition (smudge free). The data for the signal map in FIG. 5A through 5D was collected without any objects in the range of the ToF system 100 so that it may show crosstalk detected during native conditions. It should be noted, that the photon-count data in the signal map is not categorized according to their time of flight. The signal map only represents a raw count of the photon events during a given time period.

FIG. 5B depicts a perspective view of the signal map from FIG. 5A. The Z axis of the signal map represents the magnitude of the total photon count. The magnitude is depicted with respect to a count per radiation-sensitive pixel (CPS). FIG. 5C depicts a view of the signal map from the Y-axis and FIG. 5D depicts a view of the grid from the Z-axis.

FIG. 6A through FIG. 6D illustrate various view of a signal map depicting crosstalk detected by an optical receiver with crosstalk variation from native conditions.

Figure 6D:
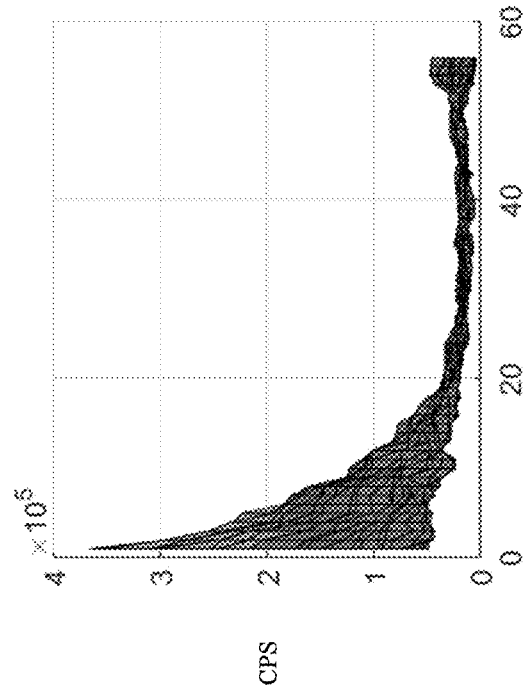
FIG. 6A through FIG. 6D illustrate various view of a signal map depicting crosstalk detected by an optical receiver with crosstalk variation from native conditions.
Figure 6C:
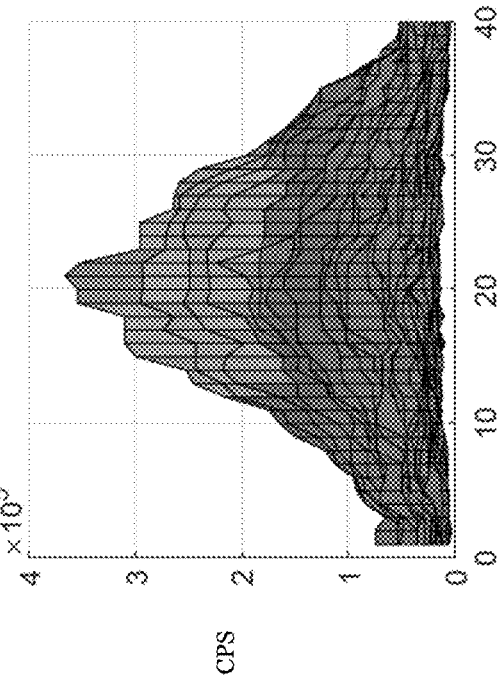
Figure 6B:
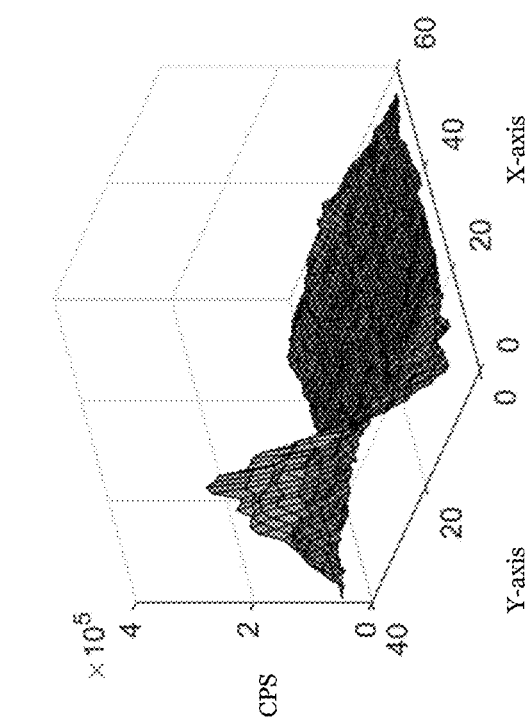
Figure 6A:
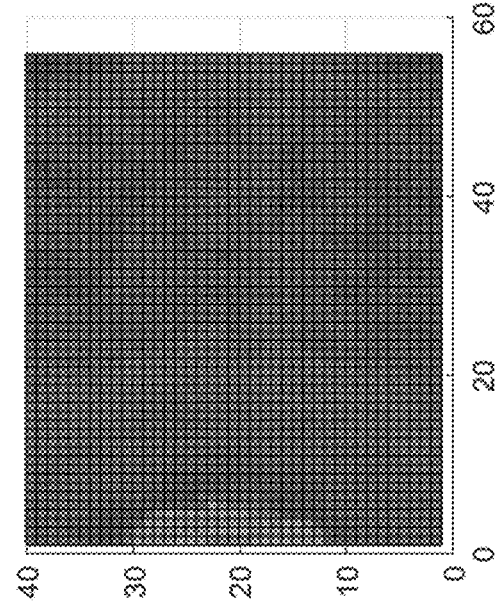

FIG. 6A depicts a top down view of a signal map that corresponds to an optical receiver 104. The cells of the grid in the signal map, once again, correspond to a radiation-sensitive pixels of an optical receiver 104. The cells of the grid are, again, shaded to represent the total number of photon events detected during a time period, but without time of flight information. The data for the grids in FIG. 6A through 6D, in contrast to the data collected for the signal map in FIG. 5A through 6D, was collected with smudging on the protective layer 406 of an optical receiver. The data for the signal map in FIG. 6A through 6D was also collected without any objects in the range of the ToF system 100 so it may be viewed to represent the crosstalk detected after smudging has occurred.

FIG. 6B depicts a perspective view of the signal map from FIG. 6A. The Z axis represents the magnitude of the total photon count in CPS. FIG. 6C depicts a view of the signal map from FIG. 6A from the Y-axis and FIG. 6D depicts a view of the signal map from the X-axis.

The potential impact that in-field variation (like smudges) may be seen by comparing the signal map from FIG. 5A through 5B with the signal map from FIG. 6A through 6B. As shown, the magnitude of the crosstalk (in terms of total photon count per ranging) has nearly doubled for some of the cells of the grid. And, smudges, or other in-field variations, may cause even greater changes in crosstalk than what is depicted in FIG. 6A through 6B. As will be appreciated, such variation may limit the effectiveness of the crosstalk compensation values generated during the native state of a ToF system 100 in a device. It, thus, may be advantageous to implement dynamic crosstalk compensation that may adjust to changing conditions.

In various embodiments, an optical receiver 104 may comprise monitoring zones that may be used to measure crosstalk during ranging operations. Live data collected from the monitoring ranging may be utilized to generate dynamic crosstalk compensation values. In various embodiments, the dynamic crosstalk compensation values may adjust native crosstalk compensation values based on data collected from monitoring zones during live ToF ranging. In various embodiments, data may be collected from monitoring zones while histogram regions are simultaneously collecting data to build photon-count histograms. The monitoring zones of an optical receiver 104 may be positioned in parts of an optical receiver that are more likely to detect crosstalk and less likely to detect photons reflected from objects in the environment.

Referring back to FIG. 5A through 5D and FIG. 6a through 6D, it is evident that more crosstalk photon events may be detected at the left and right sides of an optical receiver 104. Changes in the central regions of the optical receiver due to crosstalk, as shown in FIG. 6A through 6D, may have correlations with crosstalk changes at the edges of the optical receiver. This may allow changes in the monitoring zones to be used to estimate crosstalk realized in the central regions of an optical receiver. Interpolation may be used to assign dynamic correction values to the regions of the optical receiver based on data collected from monitoring zones. Radiation-sensitive pixels at the edges of an optical receiver may be less likely to detect photons reflected from an object within range of a ToF system 100. Due to various optical effects, photon events detected from objects are concentrated in the central regions of an optical receiver and may decrease the further a radiation sensitive pixel is from central regions of the optical receiver. As a result, it may be advantageous to locate monitoring zones of an optical receiver 104 at the edges of an optical receiver. This may allow crosstalk data to be collected from the monitoring zones while the central regions are collecting photon-count data for photon-count histograms.

Figure 7:
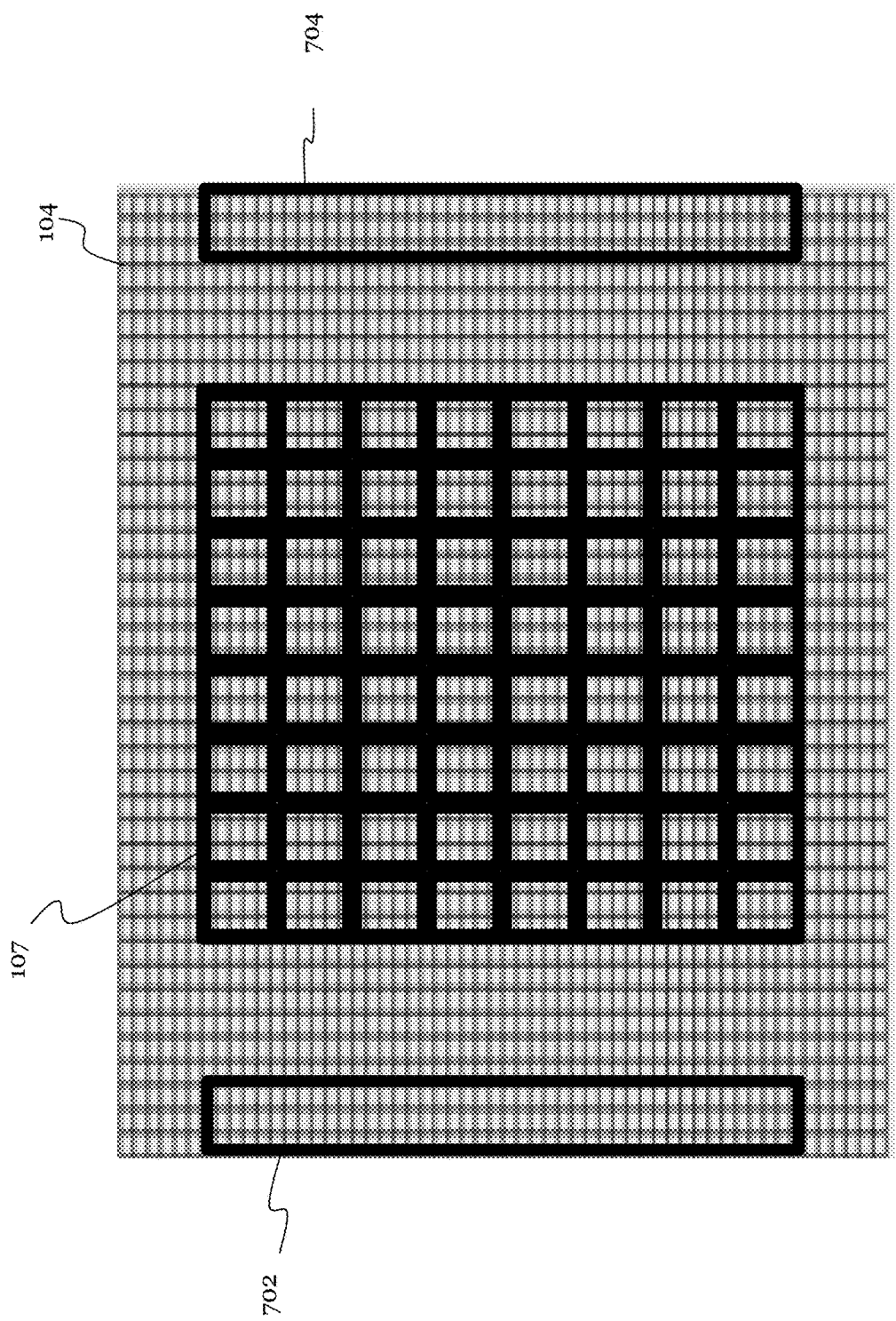
FIG. 7, depicts an optical receiver comprising monitoring zones of an embodiment.

FIG. 7, depicts an optical receiver comprising monitoring zones of an embodiment.

In various embodiments, an optical receiver 104 may comprise a first crosstalk monitoring zone 702 and a second crosstalk monitoring zone 704. The first crosstalk monitoring zone 702 may comprise a one or more radiation-pixels. The number of pixels in the first crosstalk monitoring zone 702 may vary in various embodiments. The second crosstalk monitoring zone 702 may comprise a one or more radiation-pixels. The optical receiver may also comprise a first histogram region. The number of pixels in the second crosstalk monitoring zone 704 may vary in various embodiments. Photon event data detected within the first crosstalk monitoring zone 702 and the second crosstalk monitoring zone 704 may be transmitted to the processor 126.

The optical receiver 104 may also comprise a first histogram region. 107. The number of radiation-sensitive pixels may vary in various embodiments. The optical receiver 104 may also comprise additional histogram regions. In various embodiments, the optical receiver 104 may comprise 64 histogram region. Each region may be used to generate a photon-count histogram 300.

In various embodiments, it may be advantageous to locate histogram regions between the first crosstalk monitoring zone 702 and the second crosstalk monitoring zone 704. This may be advantageous to allow the radiation-sensitive pixels of the regions to detect photon event generated (or primarily) by crosstalk while the histogram monitoring regions are detecting photons reflected from objects in an environment that may be used to generate photon-count histograms so dynamic compensation values may be calculated based on measurements taken during operation. And this data can be used to compensate for changes in crosstalk caused smudges and other deviations. As will be appreciated, in various embodiments, an optical receiver 104 may comprise more than two monitoring zones.

Photon-event data collected from the first crosstalk monitoring zone 702 and the second crosstalk monitoring zone 704 during ToF ranging may be used to calculate dynamic crosstalk compensation values. The photon-event data may comprise the photon count detected by radiation-sensitive pixels of a monitoring zone over one or more ranging time periods. In various embodiments, the photon-event data may comprise a value that has been averaged based on the number of radiation pixels in the corresponding monitoring zone.

In various embodiments, the photon-event data collected from the first monitoring zone 702 and the second monitoring zone 704 may comprise a count of photon events detected during a desired time period. In various embodiments, the photon-event data collected from the first monitoring zone 702 and the second monitoring zone 704 may also comprise time of flight data for photons detected. This may be accomplished by binning photons detected by the first monitoring zone 702 and the second monitoring zone 704 according to the time of detection relative to time of emission of an optical pulse. This may be advantageous for discriminating photons counted as a result of crosstalk from other causes.

In various embodiments, a dynamic crosstalk compensation value may be generated for each histogram region of an optical receiver 104. dynamic crosstalk compensation values for the histograms may be calculated by interpolating between the crosstalk values (photon event data) measured at the first crosstalk monitoring zone 702 and the second crosstalk monitoring zone 704. The interpolation may be weighted based on the magnitude of the difference between the native crosstalk compensation values calculated during calibration of the ToF system 100 and the data collected from the first measurement region 702 and the second measurement region 704 during live time of flight measurements. In various embodiments, spatial interpolation based on the position of a histogram region relative to the first crosstalk monitoring zone 702, the second crosstalk monitoring zone 704 or both.

For example, The photon-event data measured during calibration for the first crosstalk monitoring zone 702 and the second crosstalk monitoring zone 704 may be stored in memory 132 along with native crosstalk compensation values for the histogram regions of an optical receiver 104. The photon event data from the calibration period may be averaged on a per radiation-sensitive pixel basis. The data collected during calibration may be compared with data collected during live ToF ranging from the first crosstalk monitoring zone 702 and the second crosstalk monitoring zone 704 to determine how much of a change there has been in crosstalk detected by the first crosstalk monitoring zone 702 and the second crosstalk monitoring zone 704 between calibration and live ToF ranging (due possibly to smudging).

Photon event data may be gathered during ToF ranging for the first crosstalk monitoring zone 702 and the second crosstalk monitoring zone 704. This photon event data may be averaged on a per radiation-sensitive pixel basis like the data collected during calibration. The amount of time desired for collecting additional photon data may vary in various embodiments. In various embodiments photon-event data may be collected over multiple samples to account for noise generated by ambient light and the intrinsic shot noise of the crosstalk itself.

The photon event data measured during calibration for the first crosstalk monitoring zone 702 may be subtracted from the photon-event data measured during the live ToF time period to produce a normalization factor for the first crosstalk monitoring zone. The photon event data measured for both calibration and during live ranging may be average per radiation pixel before calculation of the normalization factor. Photon event data measured during calibration for the second crosstalk monitoring zone 704 may be subtracted from the photon-event data measured during the live ToF time period to produce a normalization factor for the second crosstalk monitoring zone 704. The normalization factor for the first crosstalk monitoring zone 702 may provide a metric of the change in crosstalk detected by an optical receiver 104 since calibration. Likewise, normalization factor for the second crosstalk monitoring zone 704 may provide a metric of the change in crosstalk detected by an optical receiver 104 since calibration, which may be due to smudging.

A weighting factor may be calculated by taking difference between the normalization factor relating to the second crosstalk monitoring zone 704 and the normalization factor relating to the first crosstalk monitoring zone 702 and dividing by the difference between photon-event data collected from the first crosstalk monitoring zone 702 and the second crosstalk monitoring zone 704 during calibration. In various embodiments, the weighting factor may calculated according to Equation 1, below.

$$\text{weighting factor} = (\text{second normalization factor} - \text{first normalization factor})/(\text{first datum} - \text{second datum}) \quad \text{Equation 1}$$

In Equation 1, the first normalization factor may comprise a normalization factor for the first monitoring zone 702, the second normalization factor may comprise a normalization factor for the second monitoring zone 704, the first datum may comprise photon event data collected during calibration for the first monitoring zone 702 averaged per pixel of the first monitoring zone 702, and the second datum may comprise photon event data collected during calibration for the second monitoring zone 704 averaged per pixel of the second monitoring zone 704 averaged per pixel of the second monitoring zone.

In various embodiments, the weighting factor may be multiplied by the difference in magnitude between the native crosstalk compensation value (that may be an averaged value per radiation-sensitive pixel) for a histogram region and the averaged (per radiation-sensitive pixel) photon event data collected from the second region. This product (which may be negative) may be subtracted from the normalization factor of the second monitoring region 704 to generate a dynamic component of a dynamic crosstalk compensation value for that histogram region. The dynamic component may be added to the native crosstalk compensation value for that histogram region (a static component) to produce the dynamic crosstalk compensation value for that histogram region. This may be repeated for each histogram region of an optical receiver 104. And, the dynamic crosstalk compensation values may be stored in the memory 132 so they may be referenced (by the processor 126 in some embodiments) to adjust the photon count histograms to mitigate the impact of crosstalk on distances calculated using the photon count histograms.

In various embodiments, a dynamic crosstalk compensation value may be calculated for each pixel and then averaged with other pixels located in the same region to generate a dynamic crosstalk compensation value for the region. In various embodiments, each region may comprise a single pixel.

In various embodiment, dynamic crosstalk compensation values may be calculated based on a spatial interpolation for the histogram regions depending on their distance for the first crosstalk monitoring zone 702 and the second crosstalk monitoring zone 704.

FIG. 8A through FIG. 8D depict a signal map showing results of native crosstalk compensation.

Figure 8D:
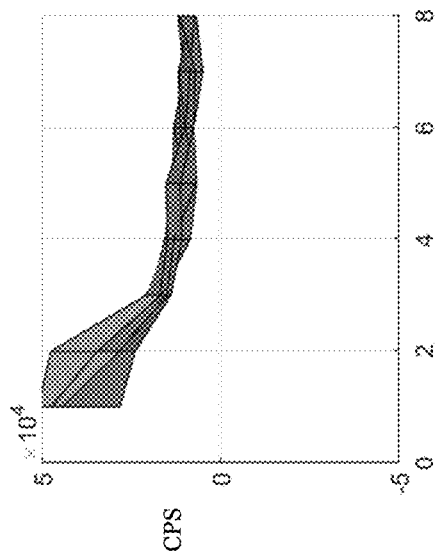
FIG. 8A through FIG. 8D depict a signal map showing results of native crosstalk compensation.
Figure 8C:
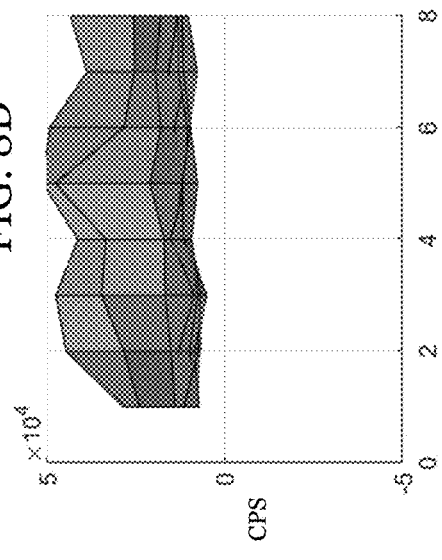
Figure 8B:
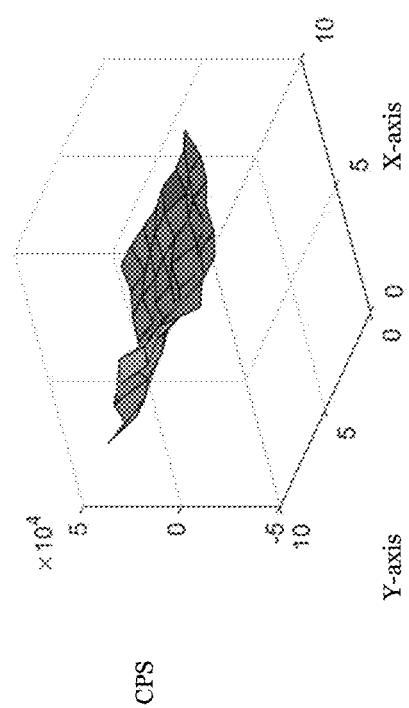
Figure 8A:
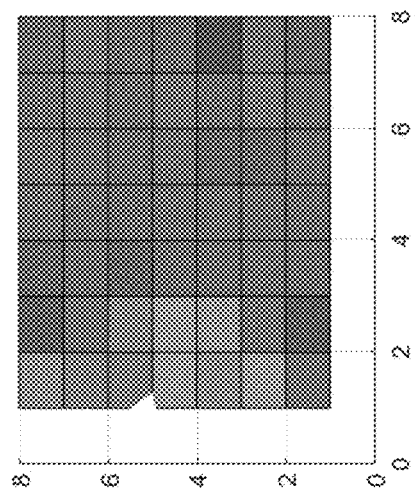

FIG. 8A shows a top down view of the signal map. FIG. 8B shows a perspective view of the signal map. FIG. 8C shows a view of the signal map from the Y-axis. And, FIG. 8D shows a view of the signal map from the X-Axis.

FIG. 9A through FIG. 9D depict a signal map showing results of dynamic crosstalk compensation of an embodiment.

FIG. 9A shows a top down view of the signal map. FIG. 9B shows a perspective view of the signal map. FIG. 9C shows a view of the signal map from the Y-axis. And, FIG. 9D shows a view of the signal map from the X-Axis.

Comparing the signal map from FIG. 8A through 8D and FIG. 9A through 9D shows that the dynamic crosstalk compensation may cut the crosstalk error by more than half.

In various embodiments, the photon event data measured by the first crosstalk monitoring zone 702, the second crosstalk monitoring zone 704 or both may be impacted by photons being reflected from objects in the vicinity of a ToF system 100. For example, reflective objects that are close to a ToF system may produce a strong signal in the histogram regions of an optical receiver 104 that may also be detected at the first crosstalk monitoring zone 702 and the second monitoring 704. This may inflate the photon event data measured at first crosstalk monitoring zone 702 and the second crosstalk monitoring zone 704. Dynamic crosstalk compensation values calculated using inflated photon event data may lead to overcompensation. The undesirable signal detected at the first crosstalk monitoring zone 702 and the second crosstalk monitoring zone 704 may be termed leakage. And, the leakage signal may dominate the crosstalk signal measured in the first crosstalk monitoring zone 702 and the second monitoring 704 in some conditions. For example close, highly reflective objects may risk high leakage signals. It may be advantageous to monitor regions an optical receiver to gauge leakage and deactivate dynamic crosstalk compensation if leakage is too high.

Figure 10:
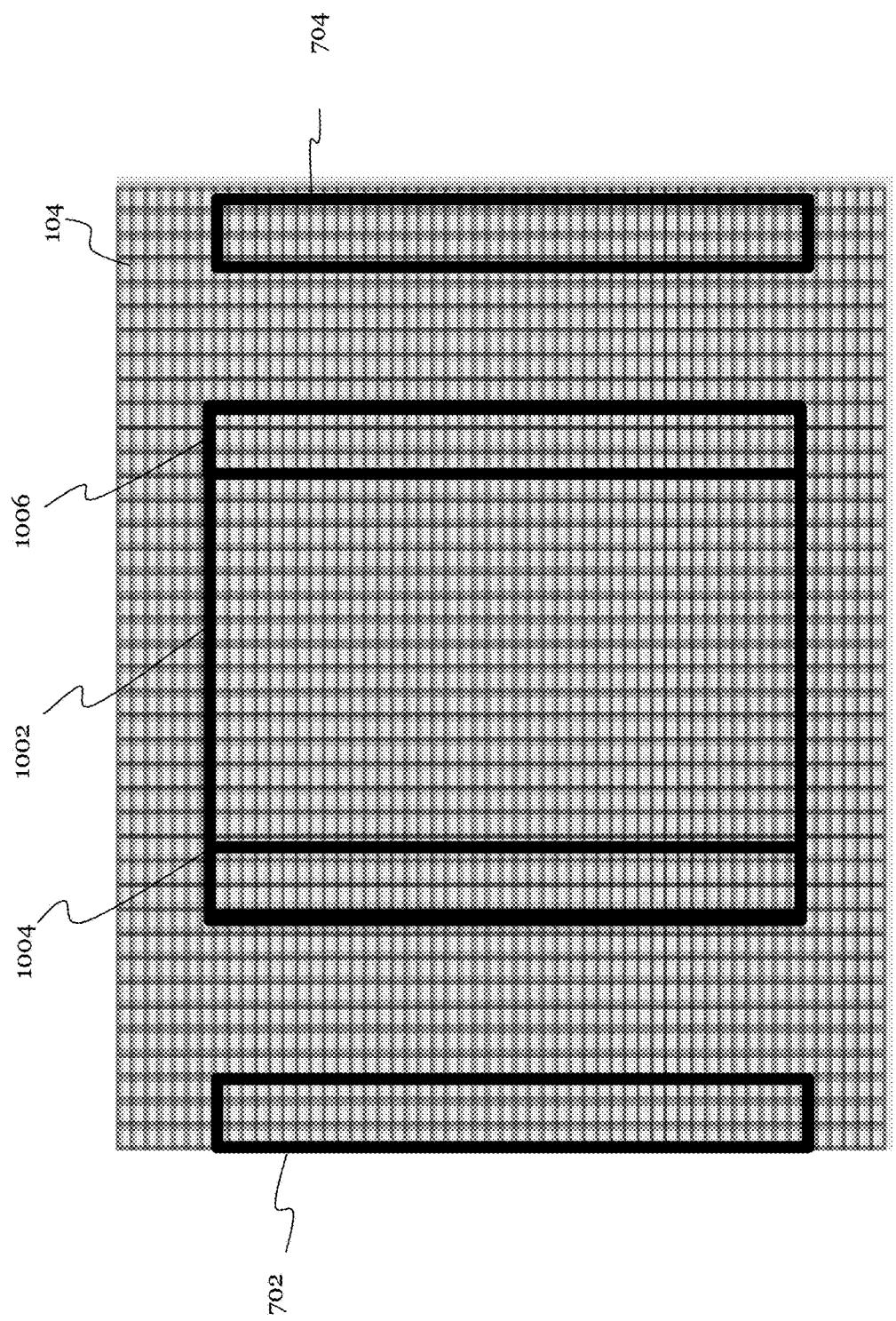
FIG. 10 depicts an optical receiver comprising leakage-monitoring zones in accordance with an embodiment.

FIG. 10 depicts an optical receiver comprising leakage-monitoring zones in accordance with an embodiment.

The optical receiver 104 may comprise a first leakage-monitoring zone 1002. In various embodiment photon-event data for the first leakage-monitoring zone 1002 may be measured while the first crosstalk monitoring zone 702 and the second crosstalk monitoring zone 704 are being measured. In various embodiments, dynamic crosstalk compensation for a ToF system 100 may be deactivated if the photon-event data within the first leakage-monitoring zone 1002 is greater than desired. This may be accomplished by setting a threshold value for the first leakage-monitoring zone 1002. If the threshold is exceeded, then dynamic crosstalk compensation may be disabled. In various embodiments, the threshold may be based on photon event data that averaged per radiation pixel of the first leakage-monitoring zone 1002. The threshold, itself, may also be subject to compensation due to conditional changes such as temperature fluctuation. The signal from the first leakage-monitoring zone 1002 may be adjusted for crosstalk before determining whether the threshold has been exceeded to prevent high crosstalk from disabling dynamic crosstalk compensation. The crosstalk compensation for the signal from the first crosstalk monitoring zone 702 may be based on the most recent dynamic crosstalk compensation value generated. In various embodiments, the crosstalk compensation for the signal from the first crosstalk monitoring zone may be based on native crosstalk compensation. The first leakage-monitoring zone 1002 may overlap partially or completely with the histogram regions of the optical receiver. 104.

The optical receive 104 may comprise additional leakage-monitoring zones. A second leakage-monitoring zone 1004 may cover a second leakage-monitoring region of an optical receiver 104. A third leakage-monitoring zone 1006 may cover a third leakage-monitoring region of an optical receiver 104. As will be appreciated, an optical receiver 104 may comprise additional leakage monitoring zones. The leakage monitoring zones may overlap with each other. Each leakage monitoring zone may also have a corresponding threshold. And, dynamic crosstalk compensation may be deactivated if any of the thresholds are exceeded. In various embodiments, it may be advantageous to have multiple leakage-monitoring regions to detect high signals that are localized, which may impact data in a monitoring zone.

Crosstalk may also vary due to environmental conditions such as temperature. As temperature increases and decreases crosstalk may increase or decrease and the crosstalk compensation values may need to be adjusted to account for changes in temperature. In various embodiments, ToF system 100 may comprise a temperature sensor 133 (depicted in FIG. 1) that measures the temperature during time of flight ranging. The temperature sensor 133 may be in communication with the processor 126. The memory 132 may store a lookup table that may be referenced to adjust crosstalk compensation values based on the temperature measured by the temperature sensor.

Figure 11:
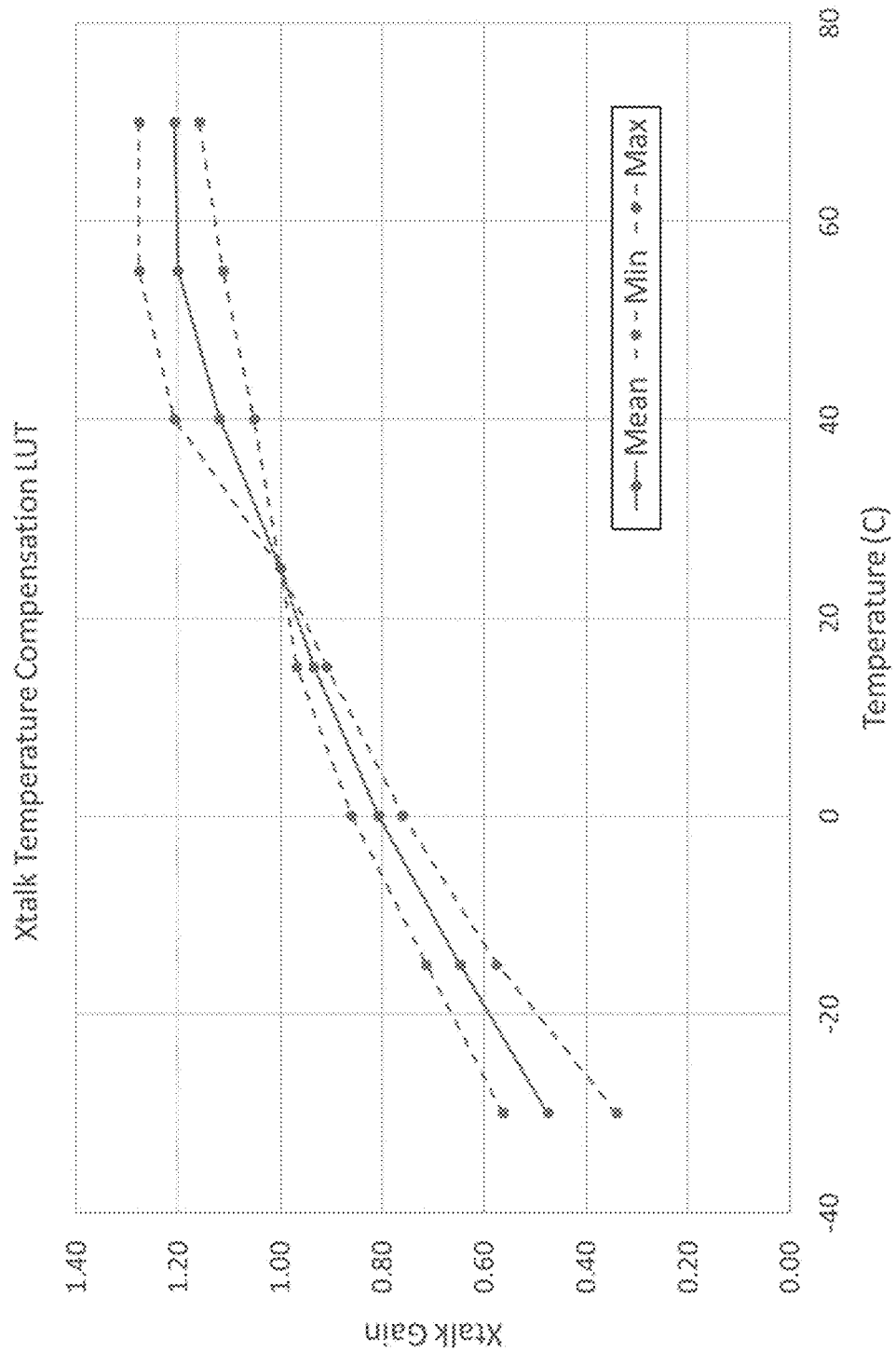
FIG. 11 depicts a plot showing relationship between crosstalk and temperature for a lookup table of an embodiment.

FIG. 11 depicts a plot showing relationship between crosstalk and temperature for a lookup table of an embodiment.

The plot shows the mean, min, and max deviations across corner modules normalized to 25 degree (C). The crosstalk compensation values may be adjusted based on the temperature according to a relationship like shown in FIG. 11. For example, dynamic crosstalk compensation calculated during operations occurring at temperature greater than 25 degrees Celsius may need to be increased and dynamic crosstalk compensation calculated during operations occurring at temperatures less than 25 degrees Celsius may need to decreased. In various embodiments, the mean value depicted in FIG. 11, may be used for crosstalk compensation and stored in a lookup table that is referenced according to the temperate detected by the temperature sensor 133.

Figure 12:
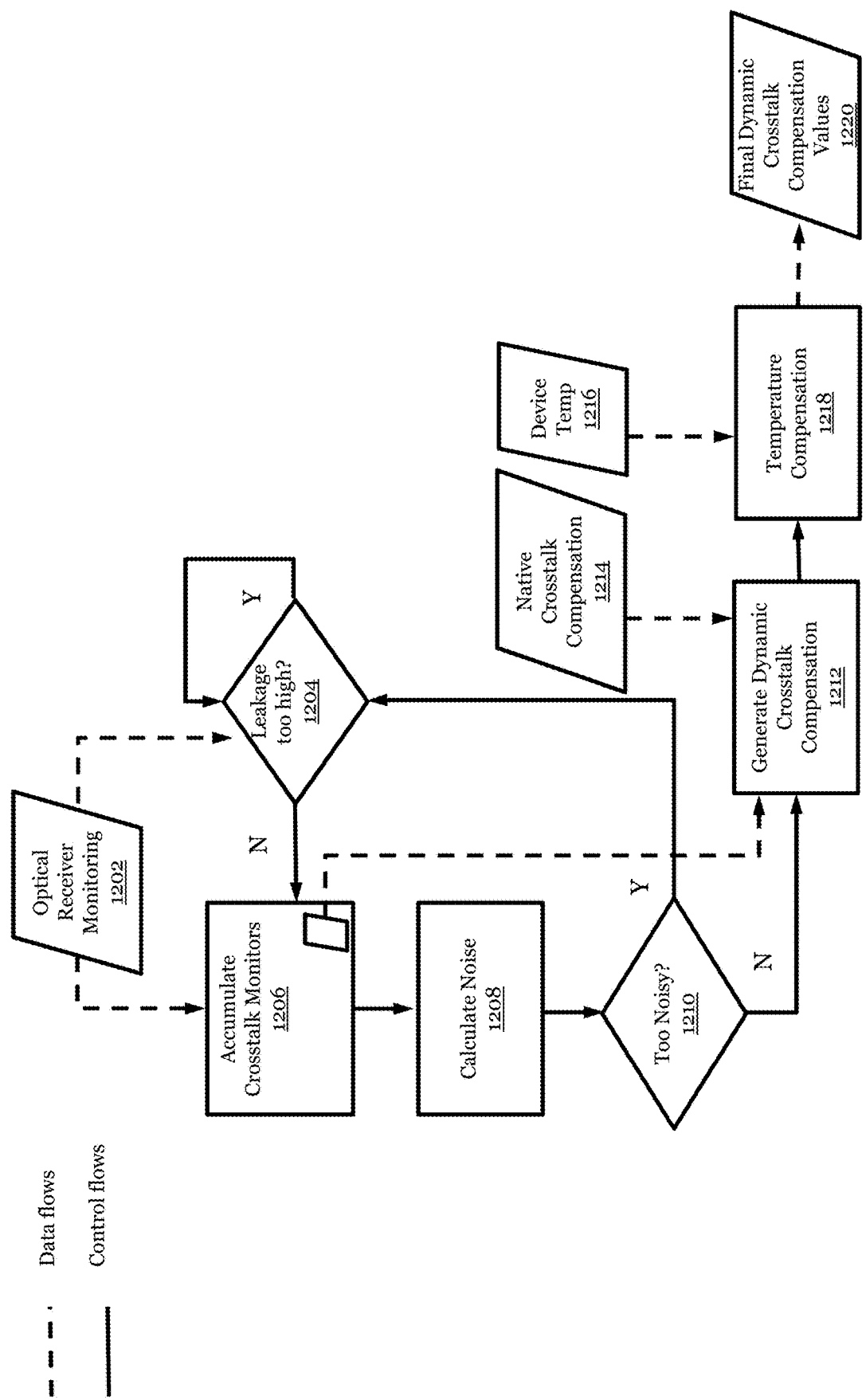
FIG. 12 depicts a flow diagram for dynamic crosstalk compensation of an embodiment.

FIG. 12 depicts a flow diagram for dynamic crosstalk compensation of an embodiment.

At 1202, the optical receiver 104 may detect photon events within the respective zones (crosstalk monitoring zones and leakage monitoring zones). This data may be communicated to the processor 126. At 1204, data collected from the leakage monitoring zones may be checked by the processor 126 to determine whether leakage is too high (exceeds a threshold for a leakage-monitoring zone). If it is too high, the dynamic crosstalk compensation may be stalled until leakage is reduced below the threshold for the leakage monitoring zone or zones. At 1206, data from the crosstalk monitoring zones is accumulated. Once data from the crosstalk monitoring zones has accumulated, noise may be calculated at step 1208. In various embodiments, the noise may be modelled using a Poisson process because light behaves according to shot noise principles. For example, for noise calculation, the standard deviation of measured photon events (detected photons) may be considered to be the square-root of the mean number of photon events dues to the Poissonian nature of light. Noise calculations based on this principle may then be propagated through the dynamic crosstalk calculation using standard noise propagation calculations.

In various embodiments, noise may be calculated after a ToF ranging. If the noise in the signal is too high, additional data from the crosstalk monitoring zones may needed. In various embodiments, a first set of data from the monitoring zones may be collected during a first ToF ranging. A second set of data from the monitoring zones may be collected during a second ToF ranging, if needed. Additional sets of data may be collected from additional ToF rangings until enough data has been collected to satisfy a desired noise tolerance. The noise tolerance may vary in various embodiments. And, in various embodiments, the noise tolerance may be programmed.

At step 1212, the dynamic crosstalk compensation values may be generated for each histogram region of an optical receiver 104. Dynamic crosstalk compensation may be calculated using photon event data accumulated at step 1206. Dynamic crosstalk compensation may also be calculated with native crosstalk compensation values 1214 that may be stored in a memory 132. At step 1218 the dynamic crosstalk compensation values for the histogram regions of the optical receiver may be adjusted based on temperature measurements taken at 1216. This may yield final crosstalk compensation values for each histogram region of the optical receiver, which can be used to remove crosstalk from photon-count histograms. As will be appreciated, the final crosstalk compensation values may be aligned in time with the expected location of crosstalk, which may comprise the zero-range position. For example, compensation may only be desirable for a given time period, and the magnitude of compensation may be scaled as a function of the final crosstalk compensation value and the estimated distribution of photons in an optical pulse used for ranging.

In various embodiments, data collected from monitoring zones may need to adjusted for the temperature before dynamic crosstalk values are compensated. This may be necessary because the native crosstalk compensation values may be calculated in an environment at a different temperature. Consequently, incoming crosstalk data may be adjusted so that calculated crosstalk compensation values are not skewed by the changes in crosstalk behaviour due to temperature. In various embodiments, native crosstalk values may be scaled to the current temperature for calculating dynamic crosstalk compensation values.

Figure 13:
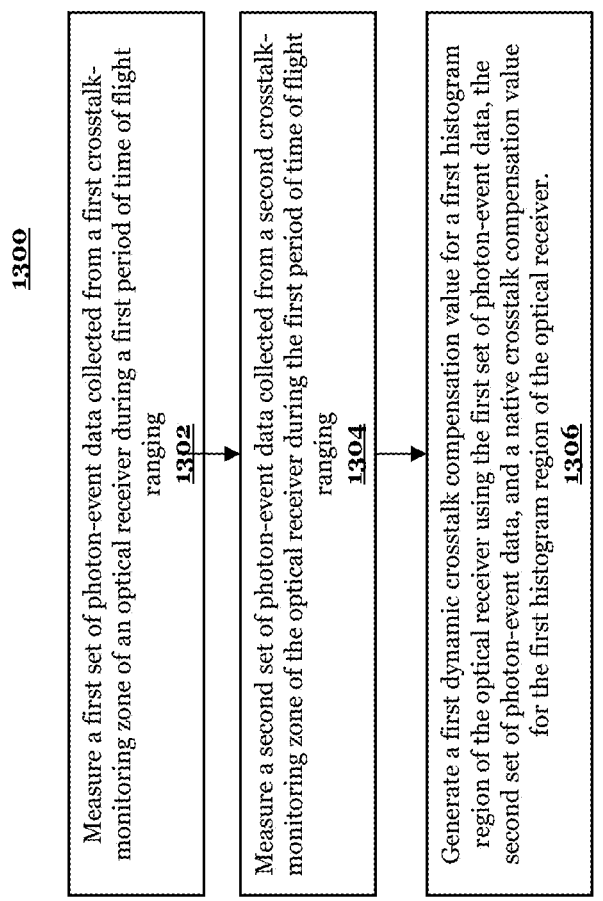
FIG. 13 depicts a flowchart in accordance with an embodiment.

FIG. 13 depicts a method 1300 in accordance with an embodiment.

In various embodiments, the method 1300 comprises at a step 1302 measuring a first set of photon-event data collected from a first crosstalk-monitoring zone of an optical receiver during a first period of time of flight ranging; at a step 1304 measuring a second set of photon-event data collected from a second crosstalk-monitoring zone of the optical receiver during the first period of time of flight ranging; and at a step 1306 generating a first dynamic crosstalk compensation value for a first histogram region of the optical receiver using the first set of photon-event data, the second set of photon-event data, and a native crosstalk compensation value for the first histogram region of the optical receiver.

In various embodiments, the method 1300, may further comprise generating a dynamic crosstalk compensation value for each histogram region of a plurality of histogram regions of the optical receiver by using the first set of photon-event data, the second set of photon-event data, and a native crosstalk compensation value for each histogram region of the optical receiver.

In various embodiments, the method 1300, may further comprise measuring photon-event data from a first leakage-monitoring zone of the optical receiver and determining that a leakage value of the first leakage-monitoring zone is below a first threshold value.

In various embodiments, the method 1300, may further comprise measuring photon-event data from a second leakage-monitoring zone; determining that a leakage value of the second leakage-monitoring zone is below a second threshold value; measuring photon-event data from a third leakage-monitoring zone; and determining that a leakage value of the third leakage-monitoring zone is below a third threshold value.

In various embodiments, the method 1300, may further comprise wherein the first histogram region is positioned between the first crosstalk-monitoring zone and the second crosstalk-monitoring zone.

In various embodiments, the method 1300, may further comprise using the first dynamic crosstalk compensation value to remove crosstalk from a photon-count histogram generated for the first histogram region.

In various embodiments, the method 1300, may further comprise using the photon-count histogram to calculate a distance of an object from a time of flight system comprising the optical receiver.

In various embodiments, the method 1300, may further comprise measuring a temperature; and adjusting the first dynamic crosstalk compensation value based on the temperature.

In various embodiments, the method 1300, may further comprise determining that a noise level is too high; measuring a third set of photon-event data collected from the first crosstalk-monitoring zone of the optical receiver during a second period of time of flight ranging; measuring a fourth set of photon-event data collected from the second crosstalk-monitoring zone of the optical receiver during the second period of time of flight ranging; generating a second dynamic crosstalk compensation value for the first histogram region of the optical receiver using the third set of photon-event data, the fourth set of photon-event data, and the native crosstalk compensation value for the first histogram region of the optical receiver; and averaging the first dynamic crosstalk compensation value for the first histogram region and the second dynamic crosstalk compensation value for the first histogram region.

In various embodiments, the method 1300, may further comprise generating the first dynamic crosstalk compensation value for the first histogram region of the optical receiver comprises interpolating between a first reference value calculated from the first set of photon-event data and a second reference value calculated from the second set of photon-event data.

In various embodiments, the method 1300, may further comprise where wherein the photon-event data collected from the first crosstalk-monitoring zone comprises times of flight of photons detected by the optical receiver at the first crosstalk-monitoring zone and the photon-event data collected from the second crosstalk-monitoring zone comprises times of flight of photons detected by the optical receiver at the second crosstalk-monitoring zone.

Figure 14:
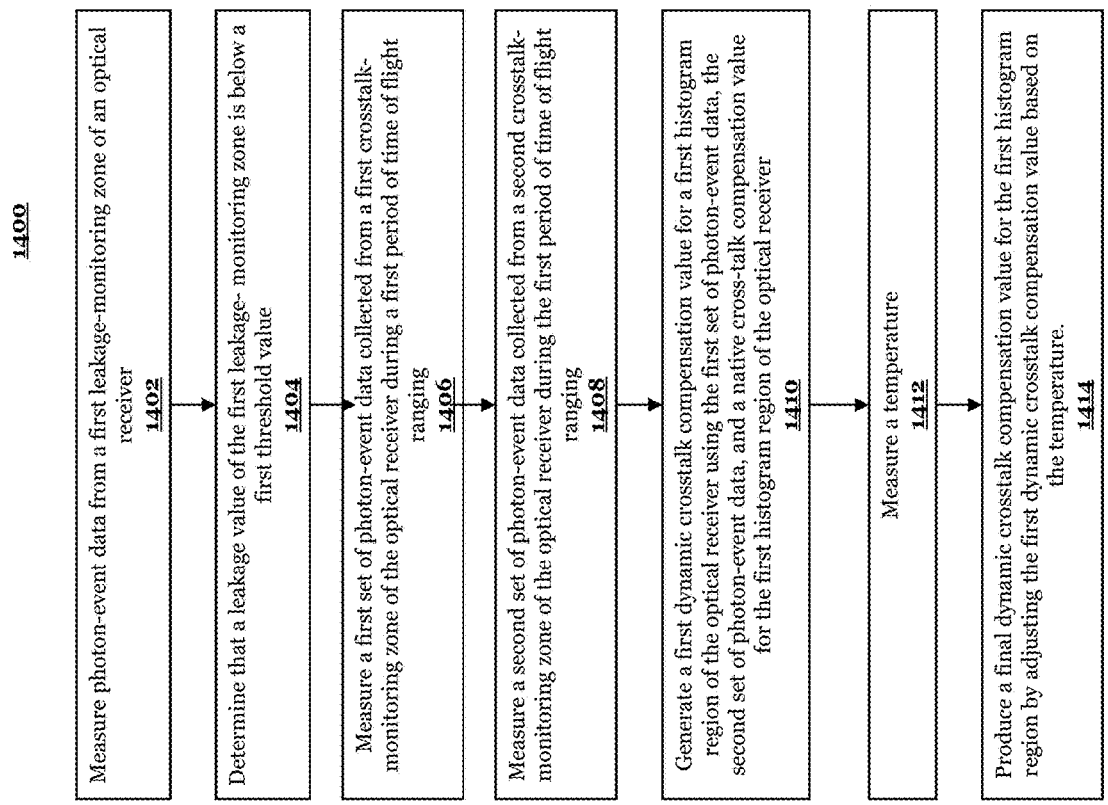
FIG. 14 depicts a flowchart in accordance with an embodiment.

FIG. 14 depicts a method 1400 of an embodiment.

In various embodiments, the method 1400 may comprise at a step 1402 measuring photon-event data from a first leakage-monitoring zone of an optical receiver; at a step 1404 determining that a leakage value of the first leakage-monitoring zone is below a first threshold value; at a step 1406 measuring a first set of photon-event data collected from a first crosstalk-monitoring zone of the optical receiver during a first period of time of flight ranging; at a step 1408 measuring a second set of photon-event data collected from a second crosstalk-monitoring zone of the optical receiver during the first period of time of flight ranging; at a step 1410 generating a first dynamic crosstalk compensation value for a first histogram region of the optical receiver using the first set of photon-event data, the second set of photon-event data, and a native cross-talk compensation value for the first histogram region of the optical receiver; at a step 1412 measuring a temperature; and at a step 1414 producing a final dynamic crosstalk compensation value for the first histogram region by adjusting the first dynamic crosstalk compensation value based on the temperature.

In various embodiments, the method 1400 may further comprise generating a final dynamic crosstalk compensation value for each histogram region of a plurality of histogram regions of the optical receiver by using the first set of photon-event data, the second set of photon-event data, the temperature and a native cross-talk compensation value for each histogram region of the optical receiver.

In various embodiments, the method 1400 may further comprise wherein a lookup table is used to adjust the first dynamic crosstalk compensation value based on the temperature.

In various embodiments, the method 1400 may further comprise wherein generating the first dynamic crosstalk compensation value for the first histogram region of the optical receiver comprises interpolating between a first reference value calculated from the first set of photon-event data and a second reference value calculated from the second set of photon-event data.

In various embodiments, the method 1400 may further comprise wherein the first histogram region is positioned between the first crosstalk-monitoring zone and the second crosstalk-monitoring zone.

Example 1

A method includes measuring a first set of photon-event data collected from a first crosstalk-monitoring zone of an optical receiver during a first period of time of flight ranging; measuring a second set of photon-event data collected from a second crosstalk-monitoring zone of the optical receiver during the first period of time of flight ranging; and generating a first dynamic crosstalk compensation value for a first histogram region of the optical receiver using the first set of photon-event data, the second set of photon-event data, and a native crosstalk compensation value for the first histogram region of the optical receiver.

Example 2

The method of Example 1 further including generating a dynamic crosstalk compensation value for each histogram region of a plurality of histogram regions of the optical receiver by using the first set of photon-event data, the second set of photon-event data, and a native crosstalk compensation value for each histogram region of the optical receiver.

Example 3

The methods of Example 1 or Example 2 further including measuring photon-event data from a first leakage-monitoring zone of the optical receiver and determining that a leakage value of the first leakage-monitoring zone is below a first threshold value.

Example 4

The methods of Example 1 to Example 3 further including measuring photon-event data from a second leakage-monitoring zone; determining that a leakage value of the second leakage-monitoring zone is below a second threshold value; measuring photon-event data from a third leakage-monitoring zone; and determining that a leakage value of the third leakage-monitoring zone is below a third threshold value.

Example 5

The methods of Example 1 to Example 4 further including wherein the first histogram region is positioned between the first crosstalk-monitoring zone and the second crosstalk-monitoring zone.

Example 6

The methods of Example 1 to Example 5 further including using the first dynamic crosstalk compensation value to remove crosstalk from a photon-count histogram generated for the first histogram region.

Example 7

The methods of Example 1 to Example 6 further including using the photon-count histogram to calculate a distance of an object from a time of flight system comprising the optical receiver.

Example 8

The methods of Example 1 to Example 7 further including measuring a temperature; and adjusting the first dynamic crosstalk compensation value based on the temperature.

Example 9

The methods of Example 1 to Example 8 further including determining that a noise level is too high; measuring a third set of photon-event data collected from the first crosstalk-monitoring zone of the optical receiver during a second period of time of flight ranging; measuring a fourth set of photon-event data collected from the second crosstalk-monitoring zone of the optical receiver during the second period of time of flight ranging; generating a second dynamic crosstalk compensation value for the first histogram region of the optical receiver using the third set of photon-event data, the fourth set of photon-event data, and the native crosstalk compensation value for the first histogram region of the optical receiver; and averaging the first dynamic crosstalk compensation value for the first histogram region and the second dynamic crosstalk compensation value for the first histogram region.

Example 10

The methods of Example 1 to Example 9 further including generating the first dynamic crosstalk compensation value for the first histogram region of the optical receiver comprises interpolating between a first reference value calculated from the first set of photon-event data and a second reference value calculated from the second set of photon-event data.

Example 11

The methods of Example 1 to Example 10 further including where wherein the photon-event data collected from the first crosstalk-monitoring zone comprises times of flight of photons detected by the optical receiver at the first crosstalk-monitoring zone and the photon-event data collected from the second crosstalk-monitoring zone comprises times of flight of photons detected by the optical receiver at the second crosstalk-monitoring zone.

Example 12

A Time of Flight system including an optical source configured to emit an light into an environment; an optical receiver that includes: a first histogram region comprising a plurality of radiation-sensitive pixels; a first crosstalk-monitoring zone comprising a plurality of radiation-sensitive pixels; and a second crosstalk-monitoring zone comprising a plurality of radiation-sensitive pixels; and a processor in communication with the optical source, the optical receiver and a memory wherein the memory stores an instruction set that, when executed, causes the processor to: drive the optical source to emit light for a time of flight ranging; collect data for a photon-count histogram from the first histogram region; calculate a dynamic crosstalk compensation value for the first histogram region from a first set of photon-event data received from the first crosstalk-monitoring zone during the time of flight ranging and a second set of photon-event data received from the second crosstalk-monitoring zone during the time of flight ranging; and adjust the photon-count histogram based on the dynamic crosstalk compensation value.

Example 13

The Time of Flight system of Example 12, wherein the dynamic crosstalk compensation value for the first histogram region is calculated by interpolating between a first reference value calculated from the first set of photon-event data and a second reference value calculated from the second set of photon-event data.

Example 14

The Time of Flight system of Example 12 or Example 13, wherein the first histogram region is positioned between the first crosstalk-monitoring zone and the second crosstalk-monitoring zone.

Example 15

The Time of Flight system of Example 12 to Example 14, wherein the instruction set, when executed further causes the processor to calculate a distance of an object from the time of flight system using the photon-count histogram.

Example 16

The Time of Flight system of Example 12 to Example 15, further including a temperature sensor and wherein the instruction set, when executed, further causes the processor to adjust the dynamic crosstalk compensation value for the first histogram region based on a temperature measured by the temperature sensor.

Example 17

The Time of Flight system of Example 12 to Example 16, wherein the optical receiver includes a plurality of histogram regions each comprising a plurality of radiation-sensitive pixels and wherein the instruction set, when executed, further causes the processor to: collect data for a photon-count histogram for each histogram region of the plurality of histogram regions; calculate a dynamic crosstalk compensation value for each histogram region of the plurality of histogram regions from the first set of photon-event data received from the first crosstalk-monitoring zone during the time of flight ranging and the second set of photon-event data received from the second crosstalk-monitoring zone during the time of flight ranging; and adjust the photon-count histogram for each region based on the dynamic crosstalk compensation value for that region.

Example 18

The Time of Flight system of Example 12 to Example 17, further including wherein the dynamic crosstalk compensation value for the first histogram region is calculated using a native crosstalk compensation value for the first histogram region.

Example 19

A method may include measuring photon-event data from a first leakage-monitoring zone of an optical receiver; determining that a leakage value of the first leakage-monitoring zone is below a first threshold value; measuring a first set of photon-event data collected from a first crosstalk-monitoring zone of the optical receiver during a first period of time of flight ranging; measuring a second set of photon-event data collected from a second crosstalk-monitoring zone of the optical receiver during the first period of time of flight ranging; generating a first dynamic crosstalk compensation value for a first histogram region of the optical receiver using the first set of photon-event data, the second set of photon-event data, and a native cross-talk compensation value for the first histogram region of the optical receiver; measuring a temperature; and producing a final dynamic crosstalk compensation value for the first histogram region by adjusting the first dynamic crosstalk compensation value based on the temperature.

Example 20

The method of Example 19 further including generating a final dynamic crosstalk compensation value for each histogram region of a plurality of histogram regions of the optical receiver by using the first set of photon-event data, the second set of photon-event data, the temperature and a native cross-talk compensation value for each histogram region of the optical receiver.

Example 21

The method of Example 19 or Example 20 further including comprise wherein a lookup table is used to adjust the first dynamic crosstalk compensation value based on the temperature.

Example 22

The methods of Example 19 to Example 21 wherein generating the first dynamic crosstalk compensation value for the first histogram region of the optical receiver comprises interpolating between a first reference value calculated from the first set of photon-event data and a second reference value calculated from the second set of photon-event data.

Example 23

The methods of Example 19 to Example 22 wherein the first histogram region is positioned between the first crosstalk-monitoring zone and the second crosstalk-monitoring zone.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   measuring a first set of photon-event data collected from a first crosstalk-monitoring zone of an optical receiver during a first period of time of flight ranging;
   measuring a second set of photon-event data collected from a second crosstalk-monitoring zone of the optical receiver during the first period of time of flight ranging; and
   generating a first dynamic crosstalk compensation value for a first histogram region of the optical receiver using the first set of photon-event data, the second set of photon-event data, and a native crosstalk compensation value for the first histogram region of the optical receiver.

2. The method of claim 1, further comprising generating a dynamic crosstalk compensation value for each histogram region of a plurality of histogram regions of the optical receiver by using the first set of photon-event data, the second set of photon-event data, and a native crosstalk compensation value for each histogram region of the optical receiver.

3. The method of claim 1, further comprising measuring photon-event data from a first leakage-monitoring zone of the optical receiver and determining that a leakage value of the first leakage-monitoring zone is below a first threshold value.

4. The method of claim 3, further comprising:
   measuring photon-event data from a second leakage-monitoring zone;
   determining that a leakage value of the second leakage-monitoring zone is below a second threshold value;
   measuring photon-event data from a third leakage-monitoring zone; and
   determining that a leakage value of the third leakage-monitoring zone is below a third threshold value.

5. The method of claim 1, wherein the first histogram region is positioned between the first crosstalk-monitoring zone and the second crosstalk-monitoring zone.

6. The method of claim 1, further comprising, using the first dynamic crosstalk compensation value to remove crosstalk from a photon-count histogram generated for the first histogram region.

7. The method of claim 6, further comprising, using the photon-count histogram to calculate a distance of an object from a time of flight system comprising the optical receiver.

8. The method of claim 1, further comprising:
   measuring a temperature; and
   adjusting the first dynamic crosstalk compensation value based on the temperature.

9. The method of claim 1, further comprising:
   determining that a noise level is too high;
   measuring a third set of photon-event data collected from the first crosstalk-monitoring zone of the optical receiver during a second period of time of flight ranging;
   measuring a fourth set of photon-event data collected from the second crosstalk-monitoring zone of the optical receiver during the second period of time of flight ranging;
   generating a second dynamic crosstalk compensation value for the first histogram region of the optical receiver using the third set of photon-event data, the fourth set of photon-event data, and the native crosstalk compensation value for the first histogram region of the optical receiver; and
   averaging the first dynamic crosstalk compensation value for the first histogram region and the second dynamic crosstalk compensation value for the first histogram region.

10. The method of claim 1, wherein generating the first dynamic crosstalk compensation value for the first histogram region of the optical receiver comprises interpolating between a first reference value calculated from the first set of photon-event data and a second reference value calculated from the second set of photon-event data.

11. The method of claim 1, wherein the photon-event data collected from the first crosstalk-monitoring zone comprises times of flight of photons detected by the optical receiver at the first crosstalk-monitoring zone and the photon-event data collected from the second crosstalk-monitoring zone comprises times of flight of photons detected by the optical receiver at the second crosstalk-monitoring zone.

12. A Time of Flight system comprising:
   an optical source configured to emit an light into an environment;
   an optical receiver comprising:
      a first histogram region comprising a plurality of radiation-sensitive pixels;
      a first crosstalk-monitoring zone comprising a plurality of radiation-sensitive pixels; and
      a second crosstalk-monitoring zone comprising a plurality of radiation-sensitive pixels; and
   a processor in communication with the optical source, the optical receiver and a memory wherein the memory stores an instruction set that, when executed, causes the processor to:
      drive the optical source to emit light for a time of flight ranging;
      collect data for a photon-count histogram from the first histogram region;
      calculate a dynamic crosstalk compensation value for the first histogram region from a first set of photon-event data received from the first crosstalk-monitoring zone during the time of flight ranging and a second set of photon-event data received from the second crosstalk-monitoring zone during the time of flight ranging; and
      adjust the photon-count histogram based on the dynamic crosstalk compensation value.

13. The Time of Flight system of claim 12, wherein the dynamic crosstalk compensation value for the first histogram region is calculated by interpolating between a first reference value calculated from the first set of photon-event data and a second reference value calculated from the second set of photon-event data.

14. The Time of Flight system of claim 12, wherein the first histogram region is positioned between the first crosstalk-monitoring zone and the second crosstalk-monitoring zone.

15. The Time of Flight system of claim 12, wherein the instruction set, when executed further causes the processor to calculate a distance of an object from the time of flight system using the photon-count histogram.

16. The Time of Flight system of claim 12, further comprising a temperature sensor and wherein the instruction set, when executed, further causes the processor to adjust the dynamic crosstalk compensation value for the first histogram region based on a temperature measured by the temperature sensor.

17. The Time of Flight system of claim 12, wherein the optical receiver comprises a plurality of histogram regions each comprising a plurality of radiation-sensitive pixels and wherein the instruction set, when executed, further causes the processor to:
   collect data for a photon-count histogram for each histogram region of the plurality of histogram regions;
   calculate a dynamic crosstalk compensation value for each histogram region of the plurality of histogram regions from the first set of photon-event data received from the first crosstalk-monitoring zone during the time of flight ranging and the second set of photon-event data received from the second crosstalk-monitoring zone during the time of flight ranging; and
   adjust the photon-count histogram for each region based on the dynamic crosstalk compensation value for that region.

18. The Time of Flight system of claim 12, further comprising wherein the dynamic crosstalk compensation value for the first histogram region is calculated using a native crosstalk compensation value for the first histogram region.

19. A method comprising:
   measuring photon-event data from a first leakage-monitoring zone of an optical receiver;
   determining that a leakage value of the first leakage-monitoring zone is below a first threshold value;
   measuring a first set of photon-event data collected from a first crosstalk-monitoring zone of the optical receiver during a first period of time of flight ranging;
   measuring a second set of photon-event data collected from a second crosstalk-monitoring zone of the optical receiver during the first period of time of flight ranging;
   generating a first dynamic crosstalk compensation value for a first histogram region of the optical receiver using the first set of photon-event data, the second set of photon-event data, and a native cross-talk compensation value for the first histogram region of the optical receiver;
   measuring a temperature; and
   producing a final dynamic crosstalk compensation value for the first histogram region by adjusting the first dynamic crosstalk compensation value based on the temperature.

20. The method of claim 19, further comprising generating a final dynamic crosstalk compensation value for each histogram region of a plurality of histogram regions of the optical receiver by using the first set of photon-event data, the second set of photon-event data, the temperature and a native cross-talk compensation value for each histogram region of the optical receiver.

21. The method of claim 20, wherein a lookup table is used to adjust the first dynamic crosstalk compensation value based on the temperature.

22. The method of claim 19, wherein generating the first dynamic crosstalk compensation value for the first histogram region of the optical receiver comprises interpolating between a first reference value calculated from the first set of photon-event data and a second reference value calculated from the second set of photon-event data.

23. The method of claim 19, wherein the first histogram region is positioned between the first crosstalk-monitoring zone and the second crosstalk-monitoring zone.

* * * * *